US009652426B2

(12) United States Patent
Su et al.

(10) Patent No.: US 9,652,426 B2
(45) Date of Patent: May 16, 2017

(54) METHOD, DEVICE, SYSTEM AND STORAGE MEDIUM FOR IMPLEMENTING PACKET TRANSMISSION IN PCIE SWITCHING NETWORK

(71) Applicant: Huawei Technologies Co., Ltd., Shenzhen (CN)

(72) Inventors: Dexian Su, Shenzhen (CN); Yimin Yao, Shenzhen (CN); Jing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 690 days.

(21) Appl. No.: 14/144,328

(22) Filed: Dec. 30, 2013

(65) Prior Publication Data

US 2014/0122769 A1    May 1, 2014

Related U.S. Application Data

(63) Continuation of application No. PCT/CN2012/083631, filed on Oct. 27, 2012.

(51) Int. Cl.
*G06F 13/24* (2006.01)
*G06F 13/40* (2006.01)
*H04L 12/931* (2013.01)

(52) U.S. Cl.
CPC ...... *G06F 13/4022* (2013.01); *G06F 13/4027* (2013.01); *H04L 49/35* (2013.01)

(58) Field of Classification Search
CPC ...... G06F 13/32; G06F 13/24; G06F 2213/02; G06F 13/14

(Continued)

(56) References Cited

U.S. PATENT DOCUMENTS 7,676,625 B2    3/2010 Cassiday et al.
7,707,346 B2    4/2010 Deshpande et al.
(Continued)

FOREIGN PATENT DOCUMENTS

CN        1547706 A     11/2004
CN      101102177 A      1/2008
(Continued)

OTHER PUBLICATIONS

Extended European Search Report, Application No. 12879152.2, Applicant Huawei Technologies Co., Ltd., date Jun. 25, 2014, 6 pages.

(Continued)

*Primary Examiner* — Glenn A Auve
*Assistant Examiner* — Kim T. Huynh
(74) *Attorney, Agent, or Firm* — Slater Matsil, LLP

(57) ABSTRACT

Embodiments of the present invention disclose a peripheral component interconnect express interface control unit. The unit includes a P2P module, configured to receive a first TLP from a RC or an EP and forward the first TLP to a reliable TLP transmission RTT module for processing. A reliable TLP transmission module is configured to determine, according to the received first TLP, sending links connected to active and standby PCIE switching units, and send the first TLP to the active and standby PCIE switching units through the sending links at the same time. A destination PCIE interface controller of the first TLP selectively receives the first TLP forwarded by the active and standby PCIE switching units and sends the first TLP to a destination EP or a destination RC. Thereby, reliable transmission of a TLP is implemented in a case of a PCIE switching dual-plane networking connection.

26 Claims, 14 Drawing Sheets

(58) Field of Classification Search
USPC ........ 710/305–306, 316–317, 260–266, 200, 710/240–244
See application file for complete search history.

(56) References Cited

U.S. PATENT DOCUMENTS

| | | |
|---|---|---|
| 7,756,123 B1 | 7/2010 | Huang et al. |
| 7,917,681 B2 | 3/2011 | Suzuki et al. |
| 8,683,110 B2 | 3/2014 | Suzuki et al. |
| 8,700,866 B2 | 4/2014 | Ikeda |
| 8,775,690 B2 | 7/2014 | Hayama |
| 8,995,302 B1 | 3/2015 | Brown et al. |
| 2003/0131179 A1 | 7/2003 | Ajanovic et al. |
| 2005/0246460 A1 | 11/2005 | Stufflebeam, Jr. |
| 2006/0206655 A1 | 9/2006 | Chappell et al. |
| 2007/0047536 A1 | 3/2007 | Scherer et al. |
| 2007/0198763 A1* | 8/2007 | Suzuki ................ G06F 13/4022 710/316 |
| 2008/0052443 A1* | 2/2008 | Cassiday ............. G06F 13/4022 710/316 |
| 2008/0071961 A1 | 3/2008 | Higuchi et al. |
| 2009/0235008 A1* | 9/2009 | Deshpande .......... G06F 13/385 710/310 |
| 2010/0180062 A1 | 7/2010 | Hidaka et al. |
| 2010/0229050 A1 | 9/2010 | Konno |
| 2011/0010481 A1 | 1/2011 | Hamadani et al. |
| 2011/0283037 A1 | 11/2011 | Koga et al. |
| 2012/0005539 A1 | 1/2012 | Paul et al. |
| 2012/0072637 A1 | 3/2012 | Oohira |
| 2014/0112131 A1 | 4/2014 | Todaka et al. |

FOREIGN PATENT DOCUMENTS

| | | |
|---|---|---|
| CN | 101501660 A | 8/2009 |
| CN | 101604299 A | 12/2009 |
| CN | 102014076 A | 4/2011 |
| JP | 2005317021 A | 11/2005 |
| JP | 2007219873 A | 8/2007 |
| JP | 2009163633 A | 7/2009 |
| JP | 2010205216 A | 9/2010 |
| JP | 4670676 B2 | 4/2011 |
| KR | 20050006783 A | 1/2005 |
| WO | 2008018485 A1 | 2/2008 |
| WO | 2011001508 A1 | 1/2011 |

OTHER PUBLICATIONS

Chinese Patent Cooperation Treaty (PCT) Search Report, Application No. PCT/CN2012/083631, date Oct. 27, 2010, 12 pages.

* cited by examiner

| Start address | End address | Destination PEIC number |
|---|---|---|
| 0X100000 | 0X800000 | 1 |
| 0XA00000 | 0XF00000 | 4 |

Address forwarding table

| Start ID | End ID | Destination PEIC number |
|----------|--------|-------------------------|
| 10 | 19 | 2 |
| 25 | 38 | 3 |
ID forwarding table
FIG. 7
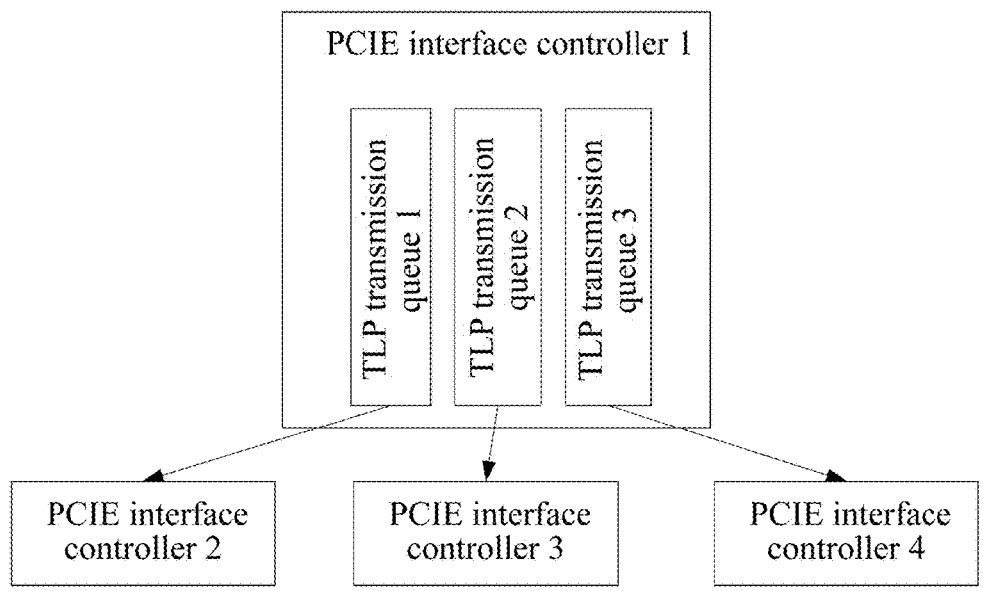
FIG. 8
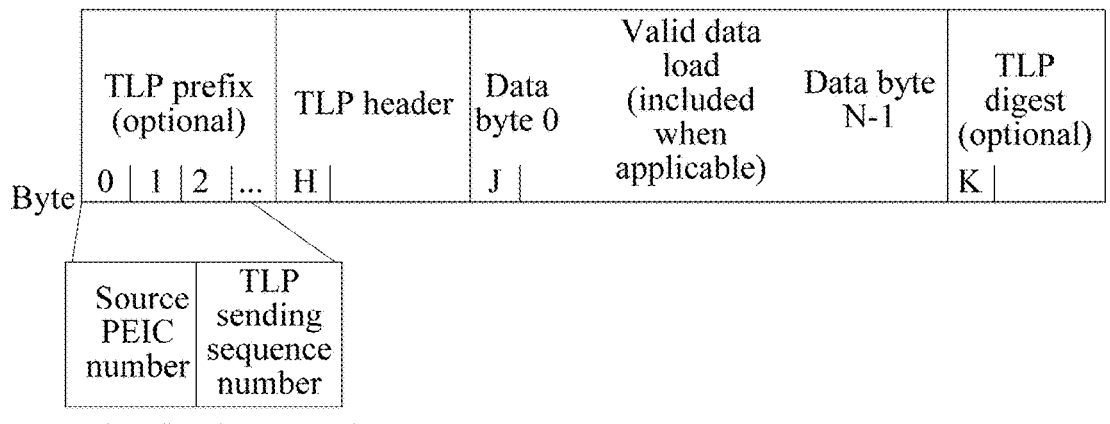
FIG. 9

Receive a third TLP from an RC or an EP  501

Determine, according to the received third TLP, a sending link connected to a PCIE switching unit, send the third TLP to the PCIE switching unit through the sending link, so that a destination PCIE interface controller of the third TLP receives the third TLP forwarded by the PCIE switching unit and sends the third TLP to a destination EP or a destination RC of the third TLP; and send the third TLP again through the sending link connected to the PCIE switching unit when a first acknowledgment message TLP returned by a destination PEIC of the third TLP and forwarded by the PCIE switching unit is not received when time is out  502

FIG. 17

METHOD, DEVICE, SYSTEM AND STORAGE MEDIUM FOR IMPLEMENTING PACKET TRANSMISSION IN PCIE SWITCHING NETWORK

This application is a continuation of International Application No. PCT/CN2012/083631, filed on Oct. 27, 2012, which is hereby incorporated by reference in its entirety.

TECHNICAL FIELD

Embodiments of the present invention relate to the field of computers, and in particular, to a method, device, system, and storage medium for implementing packet transmission in a peripheral component interconnect express (PCIE) switching network.

BACKGROUND

With the further development of computers and communication technologies, a large amount of new-generation input/output (I/O) interfaces emerge, for example, I/O interfaces using gigabit Ethernet (GE) and 10 gigabit Ethernet (10 GE) technologies, and 4G/8G fibre channel (FC) technologies. Rates of I/O interfaces are significantly improved. A bandwidth of a conventional peripheral component interconnect (PCI) bus is no longer capable of coping with a requirement for massive high-bandwidth concurrent reading and writing in a computer system, and the PCI bus becomes a bottleneck in improving system performance. Therefore, a PCIE bus is developed. The PCIE bus is capable of providing an extremely high bandwidth through multiple channels (X1/X2/X4/X8/X16/X32) to satisfy a system requirement.

The PCIE uses a point-to-point communication mode. A tree network structure is formed from a root complex (RC) to endpoint devices (EP). Data exchange in a transmission layer is performed based on a transaction layer packet (TLP). When the PCIE is used as a bus in a board, the simple tree structure is capable of ensuring reliability of the system. When the PCIE bus fails, an impact is limited inside the board. With the change of the computer, network and storage architecture, an advantage of using the PCIE as a switching network among these components becomes prominent. As shown in FIG. 1, a graphics process unit (GPU), a converge network adaptor (CNA), a solid-state disk (SSD), a video acceleration component, and so on provide a virtualization technology, and resource sharing of the GPU, CNA, SSD, and so on may be implemented between central process units (CPU) or between virtual machines (VM) through PCIE switching, thereby improving a utilization ratio of system resources. When the GPU/CNA/SSD/video acceleration component/PCIE switching component or PCIE link fails, abnormities may be caused for all CPUs due to the tree switching structure defined in PCIE specifications, thereby dramatically reducing the reliability of the system.

According to the foregoing description, due to the current tree-structure networking manner of the PCIE, the reliability of the system fails to meet an application requirement.

SUMMARY OF THE INVENTION

Accordingly, embodiments of the present invention provide a method, device, system and storage medium for implementing packet transmission in a peripheral component interconnect express (PCIE) switching network, thereby implementing packet transmission in a PCIE dual-plane switching network.

In a first aspect, an embodiment of the present invention provides a peripheral component interconnect express interface controller (PEIC) including a PCI to PCI bridge P2P module configured to receive a first transaction layer packet TLP from a root complex RC or an endpoint device EP, and forward the first TLP to a reliable TLP transmission RTT module for processing. The reliable TLP transmission module is configured to determine, according to the received first TLP, sending links connected to active and standby PCIE switching units, and send the first TLP to the active and standby PCIE switching units through the sending links at the same time, so that a destination PCIE interface controller of the first TLP selectively receives the first TLP forwarded by the active and standby PCIE switching units and sends the first TLP to a destination EP or a destination RC of the first TLP.

In a first possible implementation manner of the first aspect, the reliable TLP transmission module is further configured to encapsulate the first TLP, add a source PEIC number and a TLP sending sequence number in a self-defined end-to-end TLP prefix of the first TLP, so that a destination PEIC of the first TLP selectively receives, according to the source PEIC number and the TLP sending sequence number. The first TLP is forwarded by the active and standby PCIE switching units. The TLP sending sequence number is a sequence number of a TLP sent by a source PEIC to the destination PEIC of the first TLP. The first TLP forwarded by the active and standby PCIE switching units is selectively receiving, according to the source PEIC number and the TLP sending sequence number. For first TLPs which are forwarded by the active and standby PCIE switching units and have a same source PEIC number and a same TLP sending sequence number, only a first TLP that arrives earlier is received.

In combination with the implementation manner of the first aspect, in a second possible implementation manner, the reliable TLP transmission module includes a TLP dispatch module configured to search an address forwarding table or an ID forwarding table according to the received first TLP, determine a TLP transmission queue TTQ, and put the first TLP into the TLP transmission queue. The TLP transmission queue corresponds to the destination PEIC of the first TLP. A send module is configured to send the first TLP in the TLP transmission queue to the active and standby PCIE switching units through a sending link of the TLP transmission queue at the same time so that the destination PCIE interface controller of the first TLP selectively receives the first TLP forwarded by the active and standby PCIE switching units and sends the first TLP to the destination EP or the destination RC of the first TLP.

In combination with the second possible implementation manner of the first aspect, in a third possible implementation manner the send module is further configured to encapsulate the first TLP, and add a source PEIC number SPEIC and a TLP sending sequence number SEQUENCE in an end-to-end TLP prefix of the first TLP, so that the destination PEIC selectively receives, according to the SPEIC and the SEQUENCE. The first TLP is forwarded by the active and standby PCIE switching units. The TLP sending sequence number is a sequence number of a TLP sent by a source PEIC to the destination PEIC of the first TLP. The first TLP forwarded by the active and standby PCIE switching units is selectively receiving, according to the SPEIC and the SEQUENCE. For first TLPs which are forwarded by the active standby PCIE switching units and have a same SPEIC and a same SEQUENCE, only a first TLP that arrives earlier is received.

In combination with the second possible implementation manner of the first aspect or the third possible implementation manner of the first aspect, in a fourth possible implementation manner, the reliable TLP transmission module further includes a receive module configured to selectively receive a second TLP sent by the active and standby PCIE switching units, and send the received second TLP to the P2P module, so that the P2P module forwards the second TLP to a destination RC or a destination EP of the second TLP.

In combination with the fourth possible implementation manner of the first aspect, in a fifth possible implementation manner, the receive module is configured to selectively receive the second TLP sent by the active and standby PCIE switching units. The receive module is configured to receive the second TLP sent by the active and standby PCIE switching units. For second TLPs whose self-defined TLP prefixes carry a same source PEIC number SPEIC and a same TLP sending sequence number SEQUENCE, only a second TLP received earlier is received while discarding a second TLP received later.

In combination with any one of the second to fifth possible implementation manners of the first aspect, in a sixth possible implementation manner, the reliable TLP transmission module further includes a TLP transmission queue management module configured to maintain and manage a TLP sending sequence number and a TLP sending link of each TLP transmission queue. The TLP sending sequence number of the TLP transmission queue is a sending sequence number of a TLP sent to a destination PEIC corresponding to the transmission queue. The TLP sending link of the TLP transmission queue is a TLP sending link to the destination PEIC corresponding to the transmission queue.

In a second aspect, an embodiment of the present invention provides a peripheral component interconnect express interface controller PEIC, including a PCI to PCI bridge P2P module is configured to receive a third transaction layer packet TLP from a root complex RC or an endpoint device EP, and forward the third TLP to a reliable TLP transmission RTT module for processing. The reliable TLP transmission RTT module is configured to determine, according to the received third TLP, a sending link connected to a PCIE switching unit, and send the third TLP to the PCIE switching unit through the sending link, so that a destination PCIE interface controller of the third TLP receives the third TLP forwarded by the PCIE switching unit and sends the third TLP to a destination EP or a destination RC of the third TLP. The third TLP is sent again through the sending link connected to the PCIE switching unit if no first acknowledgment message TLP returned by a destination PEIC of the third TLP and forwarded by the PCIE switching unit is received when time is out.

In a first possible implementation manner of the second aspect, the RTT module is further configured to encapsulate the third TLP, add a source PEIC number and a TLP sending sequence number in a self-defined end-to-end TLP prefix of the third TLP, and send the encapsulated third TLP to the PCIE switching unit through the sending link, so that the destination PEIC of the third TLP returns the first acknowledgment message TLP according to the source PEIC number and the TLP sending sequence number that are in the received third TLP. A self-defined end-to-end TLP prefix of the returned first acknowledgment message TLP carries a PEIC number of the destination PEIC of the third TLP and an acknowledged TLP sending sequence number. The TLP sending sequence number in the third TLP is a sequence number of a TLP sent by a source PEIC of the third TLP to the destination PEIC of the third TLP, and the acknowledged TLP sending sequence number in the first acknowledgment message TLP is a TLP sending sequence number which is of the source PEIC and is of the third TLP already received by the destination PEIC of the third TLP.

In combination with the implementation manner of the second aspect, in a second possible implementation manner, the reliable TLP transmission module includes a TLP dispatch module configured to search a corresponding address forwarding table or ID forwarding table according to the received third TLP, determine a TLP transmission queue TTQ, and put the third TLP into the TLP transmission queue. The TLP transmission queue corresponds to the destination PEIC of the third TLP. A send module is configured to send the third TLP in the TLP transmission queue to the PCIE switching unit through a sending link of the TLP transmission queue, so that the destination PCIE interface controller of the third TLP receives the third TLP forwarded by the PCIE switching unit and sends the third TLP to the destination EP or the destination RC of the third TLP. The send module is further configured to send the third TLP again through the sending link connected to the PCIE switching unit if no first acknowledgment message TLP returned by the destination PEIC of the third TLP and forwarded by the PCIE switching unit is received when time is out. A receive module is configured to receive the first acknowledgment message TLP returned by the destination PEIC of the third TLP and forwarded by the PCIE switching unit, and transfer the first acknowledgment message TLP to an acknowledgment module. The acknowledgment module is configured to notify, according to TLP sending sequence number information and a source PEIC number that are carried in the first acknowledgment message TLP, a TLP transmission queue management module of deleting the acknowledged third TLP in the TLP transmission queue. The TLP transmission queue management module is configured to delete the acknowledged third TLP in the TLP transmission queue according to the notification of the acknowledgment module.

In combination with the second possible implementation manner of the second aspect, in a third possible implementation manner the send module is further configured to encapsulate the third TLP, add a source PEIC number SPEIC and a TLP sending sequence number in an end-to-end TLP prefix of the third TLP, and send the encapsulated third TLP to the PCIE switching unit through the sending link of the TTQ, so that the destination PEIC of the third TLP returns, according to the source PEIC number and the TLP sending sequence number, a first acknowledgment message TLP in response to the received TLP. An end-to-end TLP prefix of the returned first acknowledgment message TLP carries the source PEIC number and an acknowledged TLP sending sequence number. The TLP sending sequence number is a sequence number of a TLP sent by the source PEIC to the destination PEIC of the third TLP. The acknowledged TLP sending sequence number is a sending sequence number of a TLP already received by the destination PEIC of the third TLP from the source PEIC.

In combination with the second possible implementation manner of the second aspect or the third possible implementation manner of the second aspect, in a fourth possible implementation manner the TLP transmission queue management module is further configured to maintain a TLP sending sequence number and a TLP sending link of each TLP transmission queue.

In combination with any one of the first to third possible implementation manners of the second aspect, in a fourth possible implementation manner the receive module is further configured to receive a fourth TLP from the PCIE switching unit, determine whether the fourth TLP is an acknowledgment message TLP, if the fourth TLP is not the acknowledgment message TLP, buffer the received fourth TLP into a TLP acknowledge sequence TAS corresponding to a source PEIC of the fourth TLP. The P2P module is further configured to obtain the fourth TLP in the TLP acknowledge sequence TAS, and forward the fourth TLP to a destination RC/EP of the fourth TLP.

In combination with the fourth possible implementation manner of the second aspect, in a fifth possible implementation manner, the reliable TLP transmission module further includes a TLP acknowledge sequence management module, configured to, after the TLP acknowledge sequence receives the fourth TLP, notify the acknowledgment module of returning an acknowledgment message TLP to the source PEIC of the fourth TLP. The acknowledgment module is further configured to generate a second acknowledgment message TLP, and buffer the second acknowledgment message TLP into a TLP transmission queue corresponding to the source PEIC of the fourth TLP, so that the second acknowledgment message TLP is scheduled and sent by the send module.

In combination with any one of the second to fifth possible implementation manners of the second aspect, in a sixth possible implementation manner, the reliable TLP transmission module further includes a heartbeat module configured to send fixed-time detection TLPs to all other PEICs at a time interval, and if no detection reply TLP returned by a destination PEIC is received in specified time, notify the TLP sending queue management module of updating a sending link of a TTQ corresponding to a destination PEIC that returns the detection reply TLP. The TLP transmission queue management module is further configured to update the sending link of the TLP transmission queue according to the notification of the heartbeat module.

In a third aspect, an embodiment of the present invention provides a method for packet transmission in a peripheral component interconnect express switching network, where the method includes receiving a first TLP from an RC or an EP. Sending links connected to active and standby PCIE switching units are determined determining according to the received first TLP. The first TLP is sent to the active and standby PCIE switching units through the sending links at the same time so that a destination PCIE interface controller of the first TLP selectively receives the first TLP forwarded by the active and standby PCIE switching units. The first TLP is sent to a destination EP or a destination RC of the first TLP.

In a first possible implementation manner of the third aspect, before the sending the first TLP to the active and standby PCIE switching units through the sending links at the same time, the method further includes encapsulating the first TLP, and adding a source PEIC number and a TLP sending sequence number in a self-defined end-to-end TLP prefix of the first TLP, so that a destination PEIC selectively receives, according to the source PEIC number and the TLP sending sequence number, the first TLP forwarded by the active and standby PCIE switching units. The TLP sending sequence number is a sequence number of a TLP sent by a source PEIC of the first TLP to a destination PEIC of the first TLP. According to the source PEIC number and the TLP sending sequence number, the first TLP forwarded by the active and standby PCIE switching units is selectively received. For first TLPs which are forwarded by the active and standby PCIE switching units and have a same source PEIC number and a same TLP sending sequence number, only a first TLP that arrives earlier is received.

In combination with the third aspect or the first possible implementation manner of the third aspect, in a second possible implementation manner, the determining, according to the received first TLP, the sending links connected to the active and standby PCIE switching units and sending the first TLP to the active and standby PCIE switching units through the sending links at the same time so that the destination PCIE interface controller of the first TLP selectively receives the first TLP forwarded by the active and standby PCIE switching units and sends the first TLP to the destination EP or the destination RC of the first TLP specifically is searching a corresponding address forwarding table or ID forwarding table according to the received first TLP, determining a TLP transmission queue TTQ, and putting the first TLP into the TLP transmission queue, where the TLP transmission queue corresponds to the destination PEIC of the first TLP. The first TLP in the TLP transmission queue is sent to the active and standby PCIE switching units through a sending link of the TLP transmission queue at the same time so that the destination PCIE interface controller of the first TLP selectively receives the first TLP forwarded by the active and standby PCIE switching units and sends the first TLP to the destination EP or the destination RC of the first TLP.

In combination with the first possible implementation manner of the third aspect or the second possible implementation manner of the third aspect, in a third possible implementation manner, the method further includes for first TLPs whose self-defined TLP prefixes carry a same source PEIC number and a same TLP sending sequence number, receiving, by the destination PEIC of the first TLP, only a first TLP received earlier, and discarding a first TLP received later.

In combination with any one of the first to third possible implementation manners of the third aspect, in a fourth possible implementation manner, the method further includes maintaining a TLP sending sequence number and a TLP sending link of each TLP transmission queue, and increasing a TLP sending sequence number of a corresponding TLP transmission queue by 1 each time a TLP is sent; and maintaining a TLP sending sequence number of another PEIC from which a TLP is expected to be received, and each time a TLP is received, increasing a TLP sending sequence number of a corresponding source PEIC from which a TLP is expected to be received by 1.

In a fourth aspect, an embodiment of the present invention provides a method for packet transmission in a peripheral component interconnect express switching network, where the method includes receiving a third TLP from an RC or an EP; and determining, according to the received third TLP, a sending link connected to a PCIE switching unit, and sending the third TLP to the PCIE switching unit through the sending link, so that a destination PCIE interface controller of the third TLP receives the third TLP forwarded by the PCIE switching unit and sends the third TLP to a destination EP or a destination RC of the third TLP. The third TLP is sent again through the sending link connected to the PCIE switching unit if no first acknowledgment message TLP returned by a destination PEIC of the third TLP and forwarded by the PCIE switching unit is received when time is out.

In a first implementation manner of the fourth aspect, the determining, according to the received third TLP, the sending link connected to the PCIE switching unit and sending the third TLP to the PCIE switching unit through the sending link specifically is searching a corresponding address forwarding table or ID forwarding table according to the received third TLP, determining a TLP transmission queue TTQ, and putting the third TLP into the TLP transmission queue, where the TLP transmission queue corresponds to the destination PEIC of the third TLP; and sending the third TLP to the PCIE switching unit through a sending link of the TLP transmission queue.

In combination with the first possible implementation manner of the fourth aspect, in a second possible implementation manner, the method further includes receiving a first acknowledgment message TLP returned by the destination PEIC of the third TLP and forwarded by the PCIE switching unit; and deleting the acknowledged third TLP in the TLP transmission queue according to a TLP sending sequence number and a source PEIC number that are carried in the first acknowledgment message TLP.

In combination with the first possible implementation manner of the fourth aspect or the second possible implementation manner of the fourth aspect, in a third possible implementation manner, the method further includes encapsulating the third TLP, and adding a source PEIC number SPEIC and a TLP sending sequence number in an end-to-end TLP prefix of the third TLP, so that the destination PEIC of the third TLP returns, according to the source PEIC number and the TLP sending sequence number that are in the third TLP, a first acknowledgment message TLP in response to the received third TLP. An end-to-end TLP prefix of the returned first acknowledgment message TLP carries the source PEIC number and an acknowledged TLP sending sequence number. The TLP sending sequence number is a sequence number of a TLP sent by a source PEIC to the destination PEIC of the third TLP. The acknowledged TLP sending sequence number is a sending sequence number of a TLP already received by the destination PEIC of the third TLP from the source PEIC.

In combination with the second possible implementation manner of the fourth aspect, in a fourth possible implementation manner, before the receiving the first acknowledgment message TLP returned by the destination PEIC of the third TLP and forwarded by the PCIE switching unit, the method further includes receiving a fourth TLP sent by the PCIE switching unit, determining, according to a type of the fourth TLP, whether the fourth TLP is the first acknowledgment message TLP, and if the fourth TLP is not the first acknowledgment message TLP, forwarding the received fourth TLP to a destination RC or a destination EP of the fourth TLP.

In combination with the fourth possible implementation manner of the fourth aspect, in a fifth possible implementation manner, the method further includes returning a second acknowledgment message TLP to a source PEIC of the fourth TLP.

In combination with any one of the third to fifth possible implementation manners of the fourth aspect, in a sixth possible implementation manner, the method further includes maintaining a TLP sending sequence number and a TLP sending link of each TLP transmission queue.

In combination with any one of the third to sixth possible implementation manners of the fourth aspect, in a seventh possible implementation manner, the method further includes sending fixed-time detection TLPs to all other PEICs at a time interval, and if no detection reply TLP returned by a destination PEIC is received in specified time, updating a sending link of a corresponding TLP transmission queue.

In a fifth aspect, an embodiment of the present invention provides a system for packet transmission in a peripheral component interconnect express switching network, where the system includes at least two PCIE node devices, at least two PCIE interface controllers PEIC, and two PCIE switching units, where each of the at least two PCIE node devices is connected to one of the at least two PCIE interface controllers, and each of the at least two PCIE interface controllers is connected to the two PCIE switching units respectively. A first PCIE node device of the at least two PCIE node devices is configured to send a first TLP to a connected first PCIE interface controller of the at least two PCIE interface controllers. The first PCIE interface controller is configured to receive the first TLP, determine, according to the received first TLP, sending links connected to the two PCIE switching units, and send the first TLP to the two PCIE switching units through the sending links at the same time. Each of the two PCIE switching units is configured to forward the first TLP to a second PCIE interface controller of the at least two PCIE interface controllers. The second PCIE interface controller is a destination PCIE interface controller of the first TLP. The second PCIE interface controller is configured to selectively receive the first TLP forwarded by the PCIE switching unit and send the first TLP to a second PCIE node device of the at least two PCIE node devices, where the second PCIE node device is a destination PCIE node device of the first TLP. The second PCIE node device is configured to receive the first TLP forwarded by the second PCIE interface controller.

In a first possible implementation manner of the fifth aspect, the first PCIE interface controller is further configured to encapsulate the first TLP, and add a source PEIC number and a TLP sending sequence number in an end-to-end TLP prefix of the first TLP. The second PCIE interface controller is further configured to selectively receive, according to the source PEIC number and the TLP sending sequence number that are in the first TLP, the first TLP forwarded by the PCIE switching unit. The TLP sending sequence number is a sequence number of a TLP sent by the first PEIC to the second PEIC, and the selectively receiving, according to the source PEIC number and the TLP sending sequence number that are in the first TLP, the first TLP is, for first TLPs having a same PEIC number and a same TLP sending sequence number, receiving only a first TLP that arrives earlier.

In combination with the fifth aspect or the first possible implementation manner of the fifth aspect, in a second possible implementation manner, the first PCIE interface controller is configured to determine, according to the received first TLP, the sending links connected to the two PCIE switching units, which is the first PCIE interface controller is configured to search an address forwarding table or an ID forwarding table according to the first TLP, and determining a destination PEIC number corresponding to the first TLP, so as to determine the sending links which are connected to the two PCIE switching units and correspond to the first TLP.

In combination with the fifth aspect or the first or second possible implementation manner of the fifth aspect, in a third possible implementation manner the PCIE node device is a root complex RC or an endpoint device EP, and each PCIE interface controller is connected to one RC or at least one EP.

In a sixth aspect, an embodiment of the present invention provides a system for packet transmission in a peripheral component interconnect express switching network, where the system includes at least two PCIE node devices, at least two PCIE interface controllers PEIC, and two PCIE switching units, where each of the at least two PCIE node devices is connected to one of the at least two PCIE interface controllers, and each of the at least two PCIE interface controllers is connected to the two PCIE switching units respectively. A third PCIE node device in the at least two PCIE node devices is configured to send a third TLP to a connected third PCIE interface controller in the at least two PCIE interface controllers. The third PCIE interface controller is configured to receive the third TLP, determine, according to the received third TLP, a sending link connected to one of the two PCIE switching units, send the third TLP to the PCIE switching unit through the sending link, and send the third TLP to a fourth PCIE interface controller again through the sending link connected to the PCIE switching unit if no first acknowledgment message TLP returned by the fourth PCIE interface controller of the at least two PCIE interface controllers and forwarded by the PCIE switching unit is received when time is out, where the fourth PCIE interface controller is a destination PCIE interface controller of the third TLP. The PCIE switching unit is configured to forward the third TLP to the fourth PCIE interface controller, and forward the first acknowledgment message TLP returned by the fourth PCIE interface controller to the third PCIE interface controller. The fourth PCIE interface controller is configured to receive the third TLP forwarded by the PCIE switching unit and send the third TLP to a fourth PCIE node device of the at least two PCIE node devices. The second PCIE node device is a destination PCIE node device of the third TLP. The fourth PCIE interface controller is configured to return the first acknowledgment message TLP to the third PCIE interface controller so as to acknowledge that the third TLP is received. The fourth PCIE node device is configured to receive the third TLP forwarded by the fourth PCIE interface controller.

In a first possible implementation manner of the sixth aspect, the third PEIC is further configured to receive the first acknowledgment message TLP returned by the fourth PEIC and forwarded by the PCIE switching unit, and delete the acknowledged third TLP according to TLP sending sequence number information and a source PEIC number that are carried in the first acknowledgment message TLP.

In combination with the sixth aspect or the first possible implementation manner of the sixth aspect, in a second possible implementation manner the third PEIC is further configured to encapsulate the TLP, add a source PEIC number SPEIC and a TLP sending sequence number in an end-to-end TLP prefix of the third TLP, and send the encapsulated third TLP to the PCIE switching unit through the sending link. The fourth PEIC is further configured to return the first acknowledgment message TLP according to the source PEIC number and the TLP sending sequence number that are carried in the third TLP. An end-to-end TLP prefix of the returned first acknowledgment message TLP carries the source PEIC number and an acknowledged TLP sending sequence number. The TLP sending sequence number is a sequence number of a TLP sent by the third PEIC to the fourth PEIC, and the acknowledged TLP sending sequence number is a sending sequence number of a TLP already received by the fourth PEIC from the third PEIC.

In combination with the second possible implementation manner of the sixth aspect, in a third possible implementation manner the third PEIC is further configured to maintain a TLP sending sequence number and a TLP sending link to another PEIC.

In combination with the sixth aspect or the first to third possible implementation manners of the sixth aspect, in a fourth possible implementation manner each PCIE interface controller is further configured to send fixed-time detection TLPs to all other PEICs at a time interval, and update a sending link corresponding to a PEIC from which no returned detection reply TLP is received in specified time.

In combination with the sixth aspect or any one of the first to fourth possible implementation manners of the sixth aspect, in a fifth possible implementation manner the PCIE node device is a root complex RC or an endpoint device EP, and each PCIE interface controller is connected to one RC or at least one EP.

In a seventh aspect, an embodiment of the present invention further provides a peripheral component interconnect express interface controller PEIC, which includes a processor and a memory, where the memory stores an execution instruction, when the peripheral component interconnect express interface controller PEIC runs, the processor communicates with the memory, and the processor executes the execution instruction so that the peripheral component interconnect express interface controller PEIC executes any method in the foregoing third aspect.

In an eighth aspect, an embodiment of the present invention further provides a peripheral component interconnect express interface controller PEIC, which includes a processor and a memory, where the memory stores an execution instruction, when the peripheral component interconnect express interface controller PEIC runs, the processor communicates with the memory, and the processor executes the execution instruction so that the peripheral component interconnect express interface controller PEIC executes any method in the foregoing fourth aspect.

In a ninth aspect, an embodiment of the present invention further provides a computer readable medium, which includes a computer execution instruction, where the computer execution instruction is used for enabling a peripheral component interconnect express interface controller PEIC to execute any method in the foregoing third aspect.

In a tenth aspect, an embodiment of the present invention further provides a computer readable medium, which includes a computer execution instruction, where the computer execution instruction is used for enabling a peripheral component interconnect express interface controller PEIC to execute any method in the foregoing third aspect.

Through the foregoing solutions, in the method, device, system and storage medium for packet transmission in a PCIE switching network provided in the embodiments of the present invention, the first TLP is sent to the active and standby PCIE switching units through the sending links connected to the active and standby PCIE switching units at the same time, and the destination PEIC of the first TLP selectively receives the first TLP forwarded by the active and standby PCIE switching units and sends the first TLP to the destination EP or the destination RC of the first TLP; alternatively, the third TLP is sent to the PCIE switching unit through the sending link connected to the PCIE switching unit, the PCIE switching unit sends the received third TLP to the destination PEIC, and the destination PEIC forwards the third TLP to the destination EP or the destination RC of the third TLP and returns the first acknowledgment message TLP to the source PEIC. If no first acknowledgment message TLP returned by the destination PEIC is received when time is out, the source PEIC sends the third TLP again through the sending link connected to the PCIE switching unit, thereby implementing reliable end-to-end transmission of a TLP in a case of a PCIE switching dual-plane networking connection, and improving reliability of a system using PCIE switching.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art still may further derive other drawings according to these accompanying drawings without creative efforts:

FIG. 7 is an ID forwarding table of TLPs according to an embodiment of the present invention;

FIG. 8 is a diagram of a connection relationship between TLP transmission queues and PCIE interface controllers according to an embodiment of the present invention;

FIG. 9 is a diagram of a TLP format according to an embodiment of the present invention;

FIG. 17 is a flow chart of a method for packet transmission in a PCIE switching network according to Embodiment 9 of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
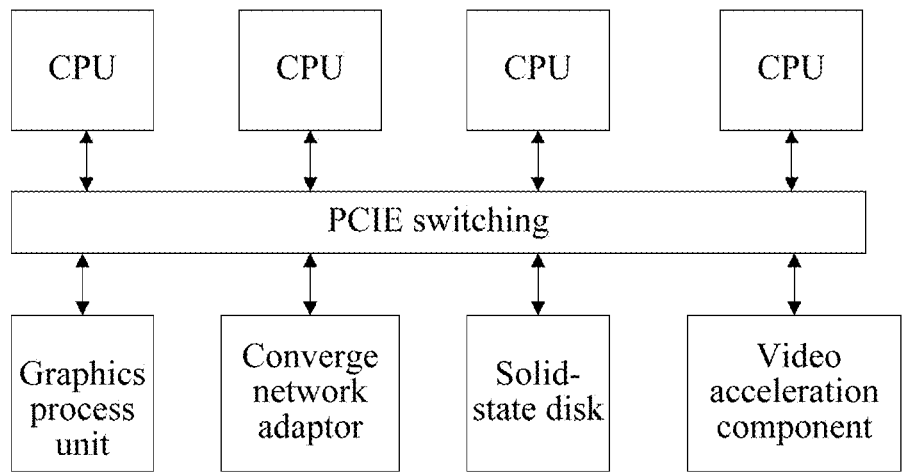
FIG. 1 is a system architecture diagram of a PCIE switching application in the prior art.
Figure 2:
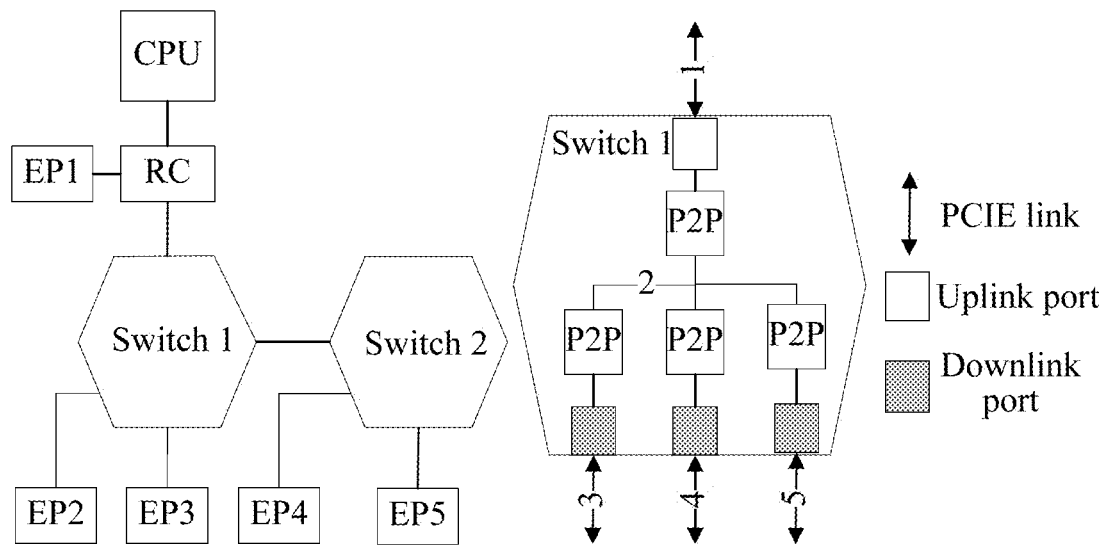
FIG. 2 is a network structural diagram of a tree network in current PCIE specifications.

FIG. 2 is a structural diagram of a tree network in current PCIE specifications. As shown in the figure, the left part is a schematic diagram of a PCIE application connection, and a tree network structure is formed from a root complex RC to endpoint devices EP. The RC may be directly connected to the EP or connected to one or more switches. The PCIE uses a point-to-point communication mode, and only one path exists between each RC and each EP/switch. The right part is an internal structural diagram of a PCIE switch. Each PCIE switch has a unique uplink port and several downlink ports. Each port of the switch has an internal virtual PCI to PCI (P2P) bridge. Due to the point-to-point communication mode and the tree switching structure that are defined in the PCIE specifications, dual-plane networking is not supported.

Figure 3:
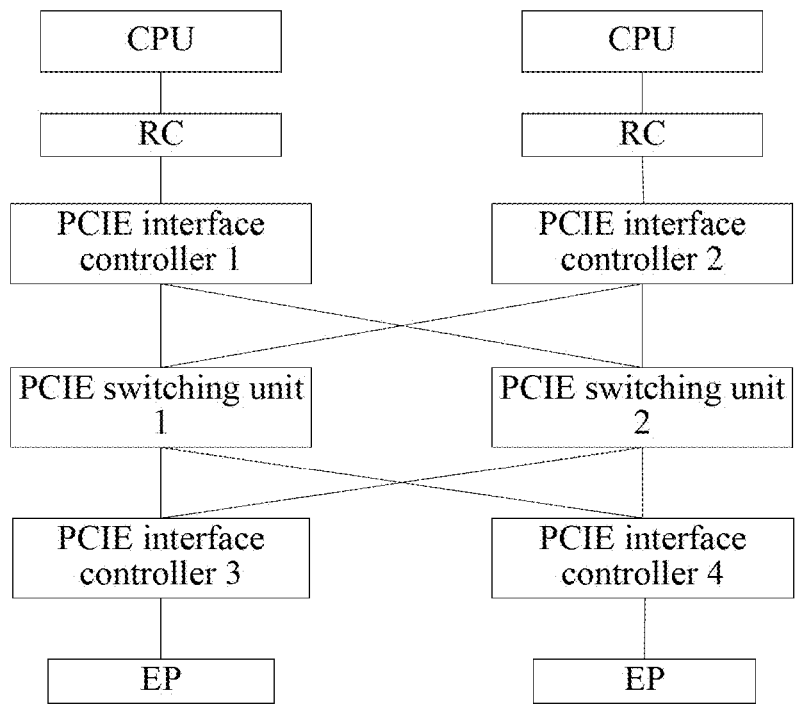
FIG. 3 is a network structural diagram of a PCIE network according to an embodiment of the present invention.

FIG. 3 is a structural diagram of a PCIE network applied in an embodiment of the present invention. As shown in FIG. 3, a PCIE interface controller (PEIC) is added between an RC/EP and a PCIE switching unit. The PEIC is connected to the RC/EP internally, and is connected to active and standby PCIE switching units externally, thereby implementing dual-plane networking and functions such as failure detection and switching. A PCIE switching unit is a switching unit based on the PCIE specifications, and completes data exchange between PEICs. An active plane and a standby plane are configured. A PCIE switching unit 1 and a PCIE switching unit 2 in FIG. 3 represent the active plane and the standby plane of the PCIE switching respectively. The EP is a standard function device defined in the PCIE specifications, such as an Ethernet card, an FC network card, an infiniband (IB) network card, and a redundant arrays of inexpensive disks (RAID) card. The PEIC, EP, RC and PCIE switching unit perform data exchange based on the PCIE specifications.

It can be seen from the network structural diagram in FIG. 3 that, the PCIE interface controller PEIC is a component added between the RC/EP and the PCIE switching unit. The PEIC is a greatest difference between the present invention and the tree structure defined in the current PCIE specifications, and dual-plane networking based on PCIE switching is implemented through the PEIC.

Figure 4:
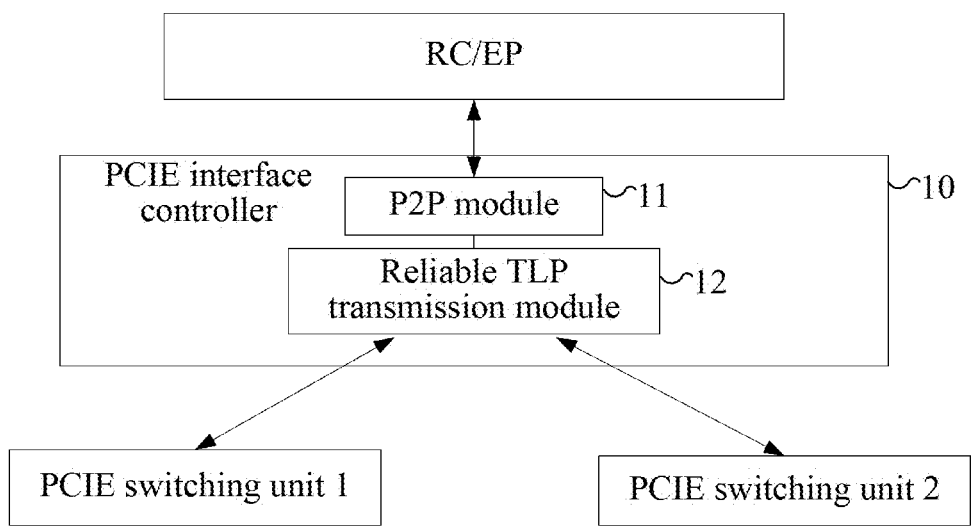
FIG. 4 is a structural diagram of a PCIE interface controller according to Embodiment 1 of the present invention.

A structure of a PEIC provided in Embodiment 1 of the present invention is shown in FIG. 4, which includes one P2P bridge module and one TLP transmission (RTT) module. The P2P bridge is a standard point-to-point bridge defined in the PCIE specifications, and implements link layer and transmission layer protocols of the PCIE. A link between an RC/EP and the PEIC is a standard PCIE link. The RTT module mainly completes selection of links to active and standby PCIE switching units and reliable end-to-end transmission of a TLP from the PEIC to any other PEIC. From the perspective of the PCIE specifications, the RTT module is a transparent module. Seen from the RC/EP, the PEIC is actually a P2P bridge in the PCIE tree structure, and a virtual P2P is connected through the RTT, PEIC and PCIE switching unit, that is, the RC/EP sees a standard PCIE switch shown in FIG. 2 rather than the active and standby PCIE switching units.

As shown in FIG. 4, a PCIE interface controller PEIC 10 includes a PCI to PCI bridge module P2P module 11 and a reliable TLP transmission module RTT module 12.

The P2P module 11 is configured to receive a first TLP from an RC or an EP, and forward the first TLP to the reliable TLP transmission module RTT module for processing.

The RTT module 12 is configured to determine, according to the received first TLP, sending links connected to active and standby PCIE switching units, and send the first TLP to the active and standby PCIE switching units through the sending links at the same time, so that a destination PCIE interface controller of the first TLP selectively receives the first TLP forwarded by the active and standby PCIE switching units and sends the first TLP to a destination EP or a destination RC of the first TLP.

Preferably, the RTT module 12 is configured to, after receiving the first TLP forwarded by the P2P module 11, search a corresponding address forwarding table or ID forwarding table according to a type of the TLP, namely, whether the packet is routed through an address or an identity (ID), obtain a destination PEIC number corresponding to the first TLP, so as to determine sending links of the active and standby PCIE switching units corresponding to the packet, and send the first TLP to the active and standby PCIE switching units through the sending links at the same time. In this case, the active and standby PCIE switching units send the received first TLP to a destination PEIC, and the destination PEIC selectively receives a corresponding packet, for example, receives a first TLP that arrives earlier and discards a first TLP that arrives later; and forwards the received first TLP to the destination EP or the destination RC of the first TLP.

Further, the RTT module 12 is configured to encapsulate the TLP, add a self-defined TLP prefix, and send the encapsulated first TLP to the active and standby PCIE switching units through the sending links at the same time. A definition of a format of the TLP is as shown in FIG. 9: According to the definition in the PCIE specifications, a TLP may include 0 or multiple standard or self-defined TLP prefixes. The TLP Prefix may implement parameter transfer of end-to-end expansion and point-to-point expansion, and implement function expansion. The TLP Prefix is further classified into local and end-to-end TLP Prefixes. A TLP Header defines a standard header part of the TLP, a Data Payload is a data part of the TLP, and a TLP Digest is a digest part of the TLP; the three parts are standard content in the PCIE specifications. Preferably, in the embodiment, transfer of a source PEIC number (SPEIC) and a TLP sending sequence number (SEQUENCE) from a source PEIC to the destination PEIC is implemented by using a self-defined end-to-end TLP Prefix added with the source PEIC number (SPEIC) and the TLP sending sequence number (SEQUENCE). The SEQUENCE is a sequence number of a TLP sent by the source PEIC to the destination PEIC, so that the destination PEIC sequences and acknowledges the received TLP according to the SPEIC and the SEQUENCE, thereby implementing selectively receiving of the first TLP transferred by the active and standby PCIE switching units. The RTT module 12 sends the first TLP to the active and standby PCIE switching units through two links; after the packet is sent, the TLP sending sequence number (SEQUENCE) corresponding to the destination PEIC is increased by 1. The destination PEIC selects a first TLP received earlier through active and standby links, sends the first TLP received earlier to the destination EP or the destination RC, and discards a first TLP received later, that is, for TLPs having a same SPEIC and a same SEQUENCE, only a TLP that arrives earlier is received. After receiving the first TLP, the destination PEIC sends the first TLP to the destination EP or the destination RC of the first TLP, thereby completing reliable and orderly transmission of the TLP.

In the PCIE interface controller provided in the embodiment of the present invention, the first TLP is sent to the active and standby PCIE switching units through the sending links connected to the active and standby PCIE switching units at the same time, and the destination PEIC of the first TLP selectively receives the first TLP forwarded by the active and standby PCIE switching units and sends the first TLP to the destination EP or the destination RC of the first TLP, thereby implementing reliable transmission of a TLP in a case of a PCIE switching dual-plane networking connection, and improving reliability of a system using PCIE switching.

Figures 5, 6:
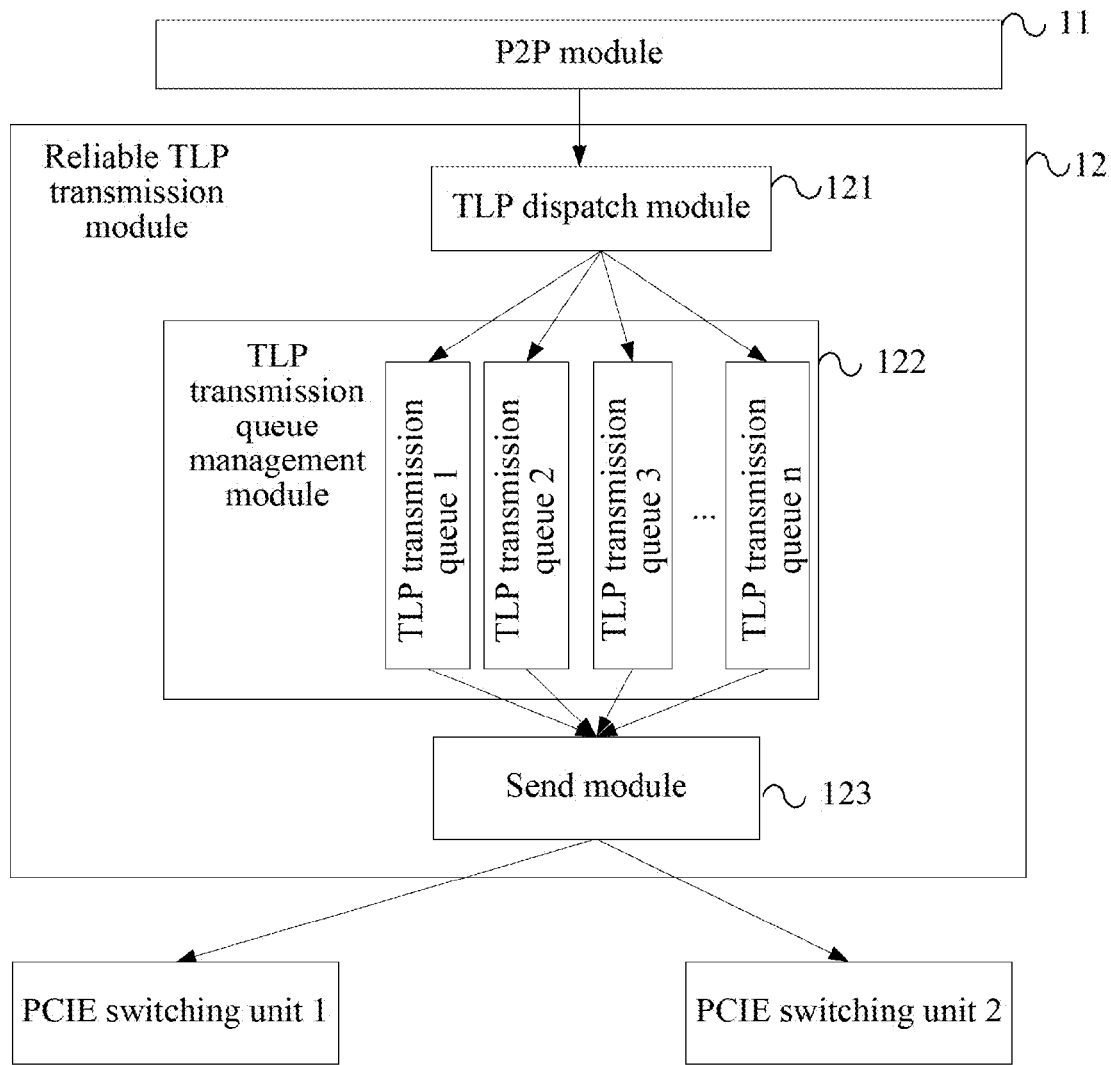
FIG. 5 is a structural diagram of a PCIE interface controller according to Embodiment 2 of the present invention.
FIG. 6 is an address forwarding table of TLPs according to an embodiment of the present invention.

FIG. 5 is a structural diagram of a PCIE interface controller according to Embodiment 2 of the present invention. Similar to the PCIE interface controller in Embodiment 1 shown in FIG. 4, a PCIE interface controller PEIC 10 in this embodiment also includes a PCI to PCI bridge module P2P module 11 and a reliable TLP transmission module RTT module 12.

The P2P module 11 is configured to receive a first TLP from an RC or an EP, and forward the first TLP to the reliable TLP transmission module RTT module for processing.

As shown in the figure, the RTT module 12 may include a TLP dispatch module 121 (DPT), configured to search a corresponding address forwarding table or ID forwarding table according to the received first TLP, determine a TLP transmission queue TTQ, and put the first TLP into the TTQ, where the TLP transmission queue corresponds to a destination PEIC of the first TLP; and a send module 123 (SND), configured to send the TLP in the TTQ to active and standby PCIE switching units through a sending link of the TLP transmission queue at the same time, so that a destination PCIE interface controller of the first TLP selectively receives the first TLP forwarded by the active and standby PCIE switching units and sends the first TLP to a destination EP or a destination RC of the first TLP.

Preferably, the TLP dispatch module 121 is configured to receive the first TLP forwarded by the P2P module 11, search the corresponding address forwarding table or ID forwarding table according to a routing manner (address routing or ID routing) of the TLP, and obtain a destination PEIC number according to a table searching result.

The address forwarding table may be shown in FIG. 6, and destination PCIE interface controller numbers corresponding to address ranges of I/O spaces or memory spaces are configured in the table. The ID forwarding table may use the format shown in FIG. 7, and destination PCIE interface controller numbers corresponding to device IDs are configured in the table, where the device ID may be an ID of a bus, a device, or a function included in the TLP. Generally, for a TLP routed through an address (for example, a read and write packet in an I/O space or a memory space), the address forwarding table is searched by using an operation address, and if the operation address hits a certain table entry in the address forwarding table, the packet is buffered into a corresponding TTQ according to a destination PEIC number of the table entry. A TLP routed through an ID, for example, a read/write request configuration packet, includes a requester ID and an access destination device ID, and for its corresponding reply packet, the address forwarding table is searched by using the requester ID in the original request packet. If a certain table entry is hit, the TLP is buffered into a corresponding TTQ according to a destination PEIC number in the table. The address forwarding table and the ID forwarding table may be directly configured on the RTT module, and may also be configured on another module of the PCIE interface controller and obtained by the RTT from a corresponding module.

As shown in FIG. 5, the RTT module 12 further includes multiple TLP transmission queues, for example, a TLP transmission queue 1 to a TLP transmission queue n in the figure, and each TLP transmission queue TTQ corresponds to a destination PEIC. For example, as shown in FIG. 8, three TLP transmission queues of the PCIE interface controller 1: a TLP transmission queue 1/a TLP transmission queue 2/a TLP transmission queue 3 correspond to tree destination PEICs respectively: a PCIE interface controller 2/a PCIE interface controller 3/a PCIE interface controller 4. For example, if the PCIE interface controller 1 receives a TLP sent to the PCIE interface controller 2, the PCIE interface controller 1 buffers the TLP into the TLP transmission queue 1 according to a corresponding relationship. Dynamic addition or deletion may be performed on the corresponding relationship between TTQs and PEICs according to a change of devices. For example, when a new PEIC device is added into a network, a corresponding TTQ needs to be added. Further, each TTQ stores a TLP sending sequence number (SEQUENCE) and a TLP sending link from a source PEIC to the destination PEIC, where the TLP sending sequence number of the PEIC refers to a sequence number of a TLP sent to the destination PEIC. The TLP sending sequence number of the PEIC of the TTQ is increased by 1 each time the TLP transmission queue TTQ sends a TLP. The TLP sending link refers to a communication link through which the queue sends a TLP to the destination PEIC. Specifically, the TTQ may maintain the TLP sending link and save related information.

Further, the RTT module 12 includes a TLP transmission queue management module 122, configured to maintain and manage a TLP sending sequence number and a TLP sending link of each TLP transmission queue.

Preferably, the send module 123 schedules the first TLP in the TLP transmission queue TTQ, encapsulates the TLP, adds a self-defined TLP prefix, and sends the encapsulated first TLP to the active and standby PCIE switching units through the sending link of the TTQ at the same time. A definition of a format of the TLP is as shown in FIG. 9: According to the definition in the PCIE specifications, a TLP may include 0 or multiple standard or self-defined TLP prefixes. The TLP Prefix may implement parameter transfer of end-to-end expansion and point-to-point expansion, and implement function expansion. The TLP Prefix is further classified into local and end-to-end TLP Prefixes. A TLP Header defines a standard header part of the TLP, a Data Payload is a data part of the TLP, and a TLP Digest is a digest part of the TLP; the three parts are standard content in the PCIE specifications. Preferably, in the embodiment, transfer of a source PEIC number (SPEIC) and a TLP sending sequence number (SEQUENCE) from the source PEIC to the destination PEIC is implemented by using a self-defined end-to-end TLP Prefix added with the source PEIC number (SPEIC) and the TLP sending sequence number (SEQUENCE). The SEQUENCE is a sequence number of a TLP sent by the source PEIC to the destination PEIC, namely, a sequence number of a TLP sent to the destination PEIC corresponding to the TLP transmission queue, and is sequenced independently in each TTQ, so that the destination PEIC sequences and acknowledges the received TLP according to the SPEIC and the SEQUENCE, thereby implementing selectively receiving of the first TLP transferred by the active and standby PCIE switching units. The send module sends the first TLP to the active and standby PCIE switching units through two links; after the packet is sent, the TLP sending sequence number (SEQUENCE) of the TTQ is increased by 1. The destination PEIC selects a first TLP received earlier through active and standby links, sends the first TLP received earlier to the destination EP or the destination RC, and discards a first TLP received later, that is, for TLPs having a same SPEIC and a same SEQUENCE, only a TLP that arrives earlier is received. After receiving the first TLP, the destination PEIC sends the first TLP to the destination EP or the destination RC of the first TLP, thereby completing reliable and orderly transmission of the TLP.

Further, the P2P module 11 is configured to, before forwarding the first TLP to the reliable TLP transmission RTT module for processing, determine, according to a type of the received TLP, and a destination device ID or an access destination address in the packet, whether the first TLP needs to be forwarded to the reliable TLP transmission module RTT module for processing. The P2P module searches a corresponding address forwarding table or ID forwarding table according to the type of the received packet (address routing or ID routing). If a destination PEIC is configured in the address forwarding table or the ID forwarding table, it indicates that the first TLP needs to be forwarded to the reliable TLP transmission module RTT module for processing, and the first TLP is forwarded to the RTT for processing. Preferably, a TLP having a local address or a local ID may be directly returned to the RC or EP without the need of being forwarded to the RTT for processing.

In the PCIE interface controller provided in the embodiment of the present invention, the TLP transmission queue is determined according to the destination PEIC of the TLP, the TLP is sent to the active and standby PCIE switching units through the sending link of the corresponding TLP transmission queue at the same time, the active and standby PCIE switching units forward the first TLP to the destination PEIC of the first TLP, and the destination PEIC selectively receives the first TLP according to the source PEIC number and the TLP sending sequence number that are carried in the self-defined end-to-end TLP prefix of the first TLP, sends the first TLP received earlier to the destination EP or the destination RC, and discards the first TLP received later, thereby completing reliable transmission of a TLP, implementing reliable transmission in a case of PCIE dual-plane networking, and improving reliability of a system using PCIE switching.

Figure 10:
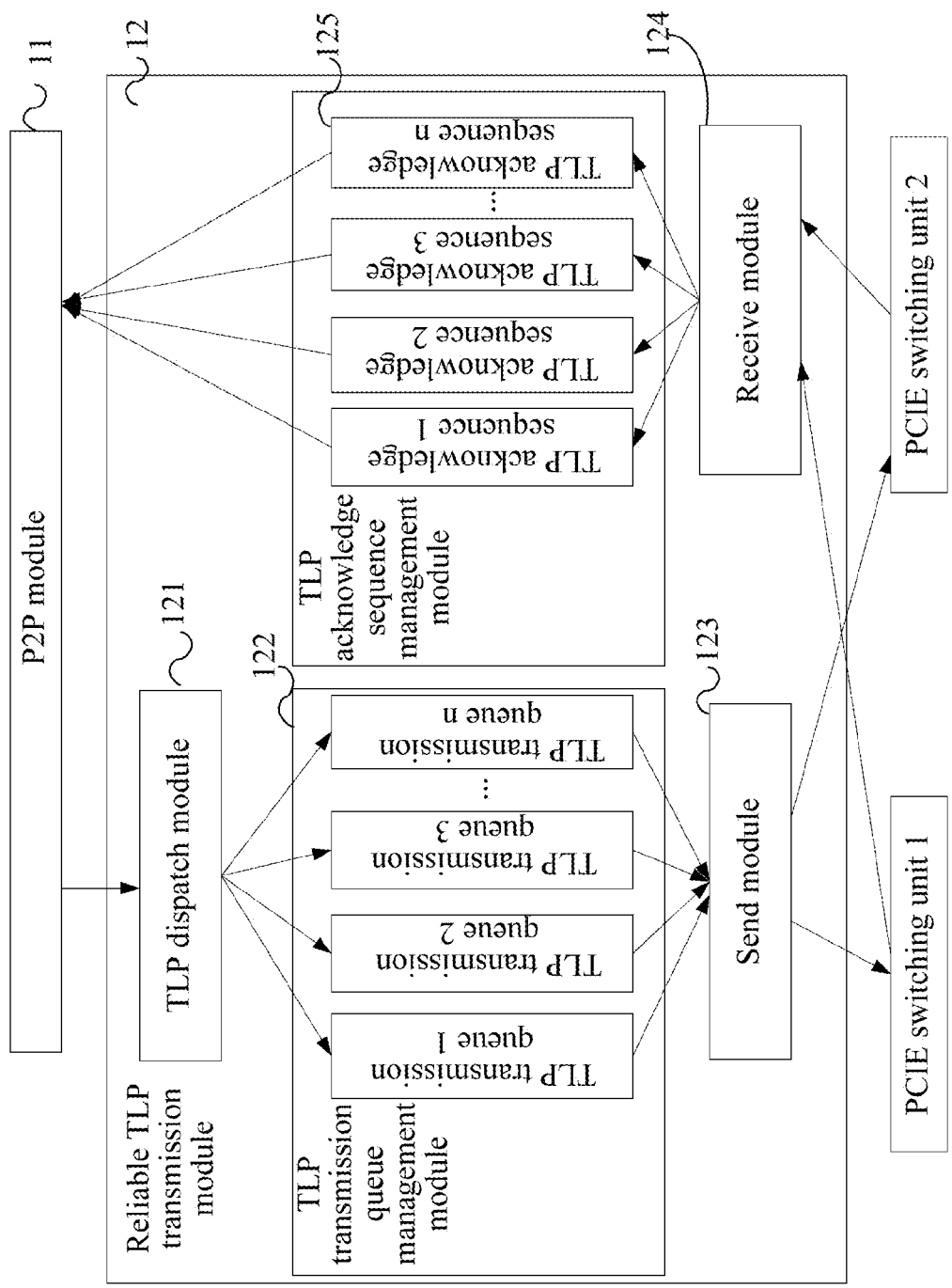
FIG. 10 is a structural diagram of a PCIE interface controller according to Embodiment 3 of the present invention.

FIG. 10 is a structural diagram of a PCIE interface controller according to Embodiment 3 of the present invention. Based on the PCIE interface controller in Embodiment 2 shown in FIG. 5, the reliable TLP transmission module RTT module 12 in the embodiment of the present invention further includes:

a receive module 124, configured to selectively receive a second TLP sent by the active and standby PCIE switching units, and send the received second TLP to the P2P module, so that the P2P module forwards the second TLP to a destination RC/EP of the second TLP.

Preferably, when the PEIC is used as a receiving end (destination PEIC) of the TLP, the receive module 124 may selectively receive the TLP according to a SPEIC and a SEQUENCE that are carried in a self-defined end-to-end TLP prefix of the second TLP sent by the active and standby PCIE switching units, that is, for second TLPs which are successively received through the two links and have a same SPEIC and a same SEQUENCE, only a second TLP received earlier is selected and sent to the destination RC/EP of the second TLP through the P2P module, and a second TLP received later is discarded.

Preferably, as shown in FIG. 10, the RTT module 12 may further include multiple TLP acknowledge sequences TAS (TLP Acknowledge Sequence). Each TLP acknowledge sequence TAS corresponds to a peer PEIC (the source PEIC of the packet), that is, corresponds to a TLP transmission queue through which the peer PEIC sends a packet to the local end. That is, each PEIC connected to the PEIC has a TLP transmission queue corresponding to a TAS. The TTQ is used for sending, and the TAS is used for receiving. Each TAS has an expected sequence number, which represents a SEQUENCE that should be carried by a next TLP received from a corresponding peer PEIC (the source PEIC of the packet). For example, if a TLP acknowledge sequence 1 of a TLP interface controller 1 corresponds to a TLP transmission queue 1 of a TLP interface controller 2, the TAS 1 of the PEIC 1 records a SEQUENCE carried in a TLP expected to be received from the source end PEIC 2 and sent through the TTQ 1 of the PEIC 2. For example, if an expected sequence number of the TAS 1 of the PEIC 1 is 3, it indicates that a SEQUENCE of a next TLP that the PEIC 1 plans to receive from the source end PEIC 2 should be 3. Dynamic addition or deletion may be performed on a corresponding relationship between TASs and TTQs according to a change of TTQs. For example, when a new PEIC device is added into a network, a corresponding TTQ needs to be added, and a TAS also needs to be added. Preferably, the receive module 124 receives the second TLP, determines a corresponding TAS according to the SPEIC in the self-defined TLP Prefix in the second TLP, compares the SEQUENCE in the second TLP with the expected sequence number in the TAS, and sends the second TLP to the P2P module if the SEQUENCE in the second TLP is equal to the expected sequence number in the TAS, so that the P2P module forwards the second TLP to the destination RC/EP and increases the expected sequence number of the TAS by 1; and if the SEQUENCE in the second TLP is not equal to the expected sequence number in the TAS, discards the TLP, thereby implementing that for the TLPs having the same SPEIC and the same SEQUENCE, only one TLP is received, ensuring that the packets are received one by one in order, and implementing reliable receiving in dual planes.

Further, the RTT module 12 includes a TLP acknowledge sequence management module 125, configured to maintain and manage an expected sequence number of each TLP acknowledge sequence.

In the PCIE interface controller provided in the embodiment of the present invention, the second TLP sent by the active and standby PCIE switching units is selectively received. Only the second TLP received earlier is selected and sent to the destination RC/EP of the second TLP through the P2P module, and the second TLP received later is discarded, thereby completing reliable and orderly dual fed and selective receiving transmission of TLPs, implementing PCIE dual-plane networking, and improving reliability of a system using PCIE switching.

Figure 11:
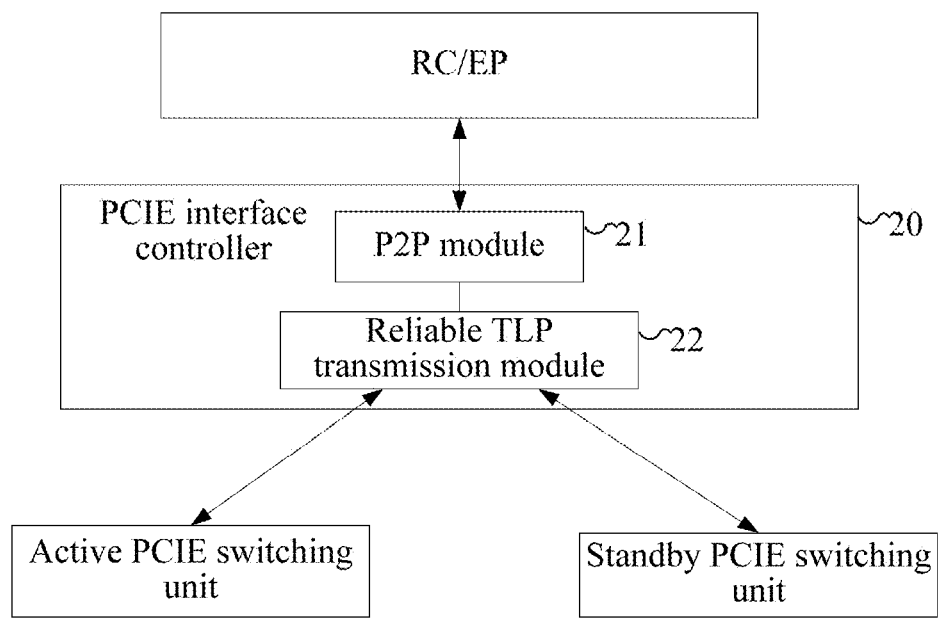
FIG. 11 is a structural diagram of a PCIE interface controller according to Embodiment 4 of the present invention.

FIG. 11 is a structural diagram of a PCIE interface controller according to Embodiment 4 of the present invention. Similar to Embodiment 1 to Embodiment 3, the PCIE interface controller in this embodiment includes a P2P bridge module and a reliable TLP transmission (RTT) module. The P2P bridge is a standard point-to-point bridge defined in the PCIE specifications, and implements link layer and TLP layer protocols of PCIE. A link between an RC/EP and the PEIC is a standard PCIE link. The RTT module mainly completes selection of links to active and standby PCIE switching units and reliable end-to-end transmission of a TLP from the PEIC to any other PEIC. From the perspective of the PCIE specifications, the RTT module is a transparent module. Seen from the RC/EP, the PEIC is actually a P2P bridge in the PCIE tree structure, and a virtual P2P is connected through the RTT, PEIC and PCIE switching unit, that is, the RC/EP sees a standard PCIE switch shown in FIG. 2 rather than the active and standby PCIE switching units.

As shown in FIG. 11, a PCIE interface controller PEIC 20 includes a PCI to PCI bridge module P2P module 21 and a reliable TLP transmission module RTT module 22.

The PCI to PCI bridge module P2P module 21 is configured to receive a third TLP from an RC or an EP, and forward the third TLP to the reliable TLP transmission module RTT module for processing.

The reliable TLP transmission RTT module 22 is configured to determine, according to the received third TLP, a sending link connected to a PCIE switching unit, send the third TLP to the PCIE switching unit through the sending link, so that a destination PCIE interface controller of the third TLP receives the third TLP forwarded by the PCIE switching unit and sends the third TLP to a destination EP or a destination RC of the third TLP; and send the third TLP again through the sending link connected to the PCIE switching unit if no first acknowledgment message TLP returned by a destination PEIC of the third TLP and forwarded by the PCIE switching unit is received when time is out.

Preferably, the RTT module 22 is configured to, after receiving the third TLP forwarded by the P2P module 21, search a corresponding address forwarding table or ID forwarding table according to a type of the TLP, that is, whether the packet is routed through an address or an identity (ID), obtain a destination PEIC number corresponding to the third TLP, so as to determine a sending link of the PCIE switching unit corresponding to the packet, and send the third TLP to the PCIE switching unit through the sending link. In this case, the PCIE switching unit sends the received third TLP to the destination PEIC, so that the destination PEIC receives the third TLP and forwards the third TLP to the destination EP or the destination RC of the third TLP. Meanwhile, the destination PEIC returns a first acknowledgment message TLP for the third TLP, and the first acknowledgment message TLP is forwarded to the RTT module 22 through the PCIE switching unit, so as to indicate that the third TLP is received. The RTT module 22 sends the third TLP again through a sending link connected to the PCIE switching unit (in a case of dual planes, a sending link connected to the PCIE switching unit in this case may be different from that through which the third TLP is sent at previous time) if no first acknowledgment message TLP returned by the destination PEIC is received when time is out.

Further, the RTT module 22 is configured to encapsulate the third TLP, add a source PEIC number and a TLP sending sequence number in a self-defined end-to-end TLP prefix of the third TLP, and send the encapsulated third TLP to the PCIE switching unit through the sending link, so that the destination PEIC of the third TLP returns the first acknowledgment message TLP according to the source PEIC number and the TLP sending sequence number that are in the received third TLP. A self-defined end-to-end TLP prefix of the returned first acknowledgment message TLP carries a PEIC number of the destination PEIC of the third TLP and an acknowledged TLP sending sequence number, where the TLP sending sequence number in the third TLP is a sequence number of a TLP sent by a source PEIC of the third TLP to the destination PEIC of the third TLP, and the acknowledged TLP sending sequence number in the first acknowledgment message TLP is a TLP sending sequence number which is of the source PEIC and is of the third TLP already received by the destination PEIC of the third TLP.

In the current PCIE specifications, reliable transmission of a TLP is implemented through a point-to-point acknowledgment mechanism. For example, in FIG. 2, a switch 1 sends a TLP to a switch 2; the switch 1 saves the TLP, and does not delete the corresponding TLP until the switch 2 receives the correct TLP and returns acknowledgment information to the switch 1. However, for a TLP that is sent to the switch 2 by the RC, if a link between the switch 1 and the switch 2 fails, the packet that is already successfully sent to the switch 1 by the RC may be discarded due to the failure of the link between the switch 1 and the switch 2. However, the RC deems that the packet is sent successfully because the RC receives the acknowledgment information from the switch 1. Such failure causes that the RC cannot correctly sense a transmission result of the TLP, thereby causing a system abnormity or discarding of a data operation. In the PCIE interface controller PEIC provided in the embodiment of the present invention, the third TLP is sent to the PCIE switching unit through the sending link connected to the PCIE switching unit, the PCIE switching unit sends the received third TLP to the destination PEIC, and the destination PEIC forwards the third TLP to the destination EP or the destination RC of the third TLP, and returns the first acknowledgment message TLP to the source PEIC. The source PEIC sends the third TLP again through the sending link connected to the PCIE switching unit if no first acknowledgment message TLP returned by the destination PEIC is received when time is out, thereby implementing reliable end-to-end transmission of a TLP in a case of a PCIE switching dual-plane networking connection, and improving reliability of a system using PCIE switching.

Figure 12:
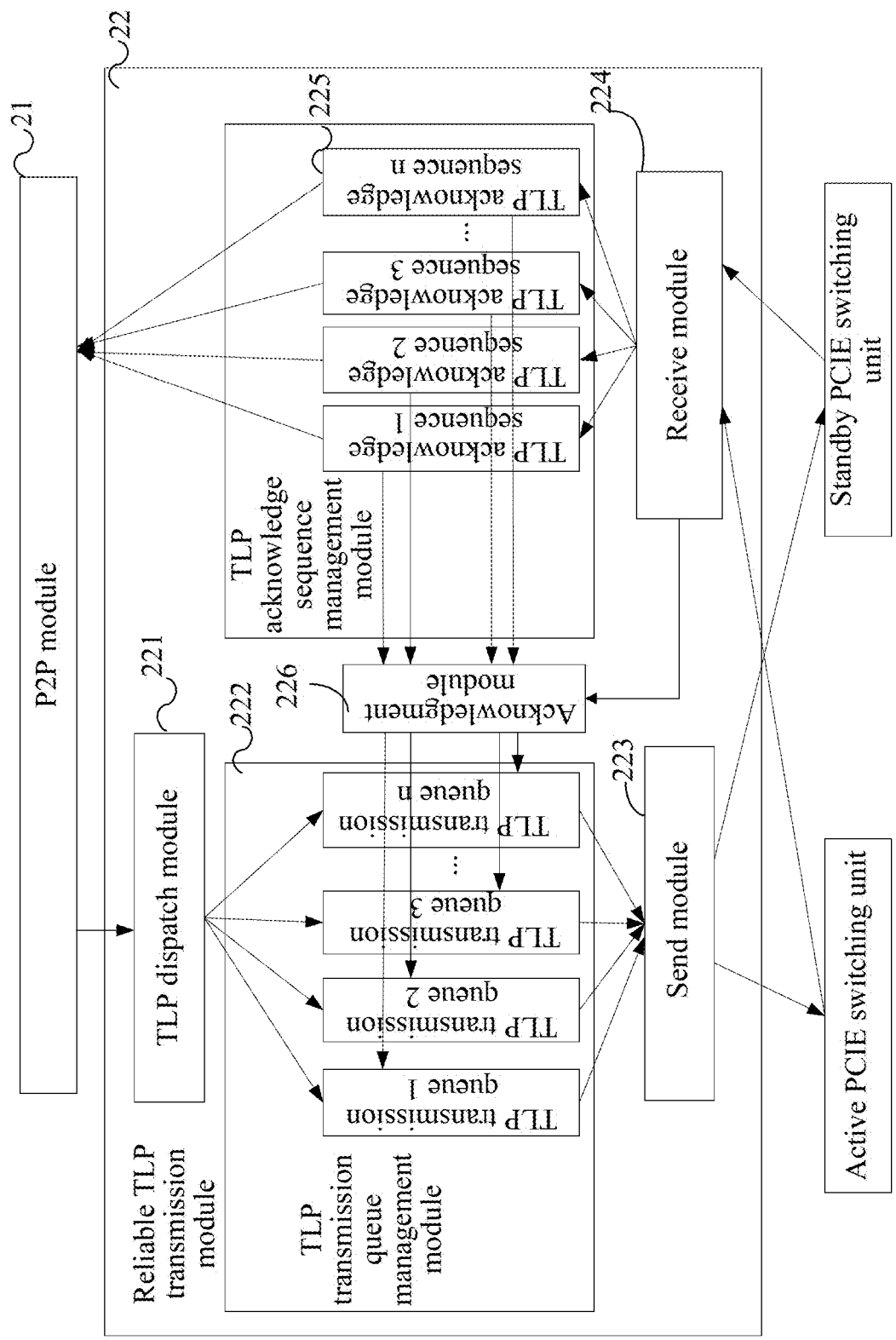
FIG. 12 is a structural diagram of a PCIE interface controller according to Embodiment 5 of the present invention.

FIG. 12 is a structural diagram of a PCIE interface controller according to Embodiment 5 of the present invention. As shown in the figure, the reliable TLP transmission RTT module 22 further includes:

a TLP dispatch module 221, configured to search a corresponding address forwarding table or ID forwarding table according to the received third TLP, determine a TLP transmission queue TTQ, and put the third TLP into the TTQ, where the TLP transmission queue corresponds to a destination PEIC of the third TLP;

a send module 223, configured to schedule the TLP transmission queue TTQ, send the third TLP to the PCIE switching unit through a sending link of the TLP transmission queue, so that a destination PCIE interface controller of the third TLP receives the third TLP forwarded by the PCIE switching unit and sends the third TLP to a destination EP or a destination RC of the third TLP; and send the third TLP again through the sending link connected to the PCIE switching unit if no first acknowledgment message TLP returned by the destination PEIC of the third TLP and forwarded by the PCIE switching unit is received when time is out;

a receive module 224, configured to receive the first acknowledgment (ACK) message TLP returned by the destination PEIC of the third TLP and forwarded by the PCIE switching unit, and transfer the first acknowledgment message TLP to an acknowledgment module 226;

the acknowledgment module 226, configured to notify, according to TLP sending sequence number (SEQUENCE) information and a source PEIC number (SPEIC) that are carried in the first acknowledgment message TLP, a TLP transmission queue management module 222 of deleting the acknowledged third TLP in the TLP transmission queue; and the TLP transmission queue management module 222, configured to delete the acknowledged third TLP in the TLP transmission queue according to the notification of the acknowledgment module 226.

Preferably, the TLP dispatch module 221 is configured to receive the third TLP forwarded by the P2P module 21, search a corresponding address forwarding table or ID forwarding table according to a routing manner of the TLP (address routing or ID routing), obtain a destination PEIC number according to a table searching result, and buffer the received third TLP into a corresponding TTQ. The address forwarding table may be shown in FIG. 6; the ID forwarding table may use the format shown in FIG. 7. Specific content and a configuration method are the same as those in the description in the foregoing Embodiment 2 and Embodiment 3, and are not repeatedly described here.

As shown in FIG. 12, the RTT module 22 further includes multiple TLP transmission queues. A function and structure of the TLP transmission queue in this embodiment are the same as those of the TLP transmission queue in Embodiment 2 shown in FIG. 5. For specific description, reference may be made to the related part, and details are not repeatedly described here.

Preferably, the send module 223 schedules the TLP in the TLP transmission queue TTQ, encapsulates the TLP, adds a self-defined TLP prefix (Prefix), and sends the encapsulated third TLP to the PCIE switching unit through the sending link of the TTQ. A definition of a format of the TLP is as shown in FIG. 9: For the related definition of the specific structure, reference may be made to the description about the format of the TLP in FIG. 9 in the foregoing Embodiment 2 and Embodiment 3, and details are not repeatedly described here. Preferably, in the embodiment, transfer of the source PEIC number (SPEIC) and the TLP sending sequence number (SEQUENCE) from the source PEIC to the destination PEIC is implemented by using the self-defined end-to-end TLP Prefix in the TLP. The SEQUENCE is a sequence number of a TLP sent by the source PEIC to the destination PEIC, namely, a sequence number of a TLP sent to the destination PEIC corresponding to the TLP transmission queue, and is sequenced independently in each TTQ, so that the destination PEIC sequences and acknowledges the received TLP according to the SPEIC+SEQUENCE. The end-to-end TLP prefix of the returned first acknowledgment message TLP carries the source PEIC number and an acknowledged TLP sending sequence number, where the SEQUENCE field in the acknowledgment message packet carries the acknowledged TLP sending sequence number, which represents the sending sequence number of the TLP already received by the destination PEIC from the source PEIC. The send module sends the third TLP to the PCIE switching unit through the sending link of the TTQ. After the packet is sent, the TLP sending sequence number (SEQUENCE) of the TTQ is increased by 1.

Further, the TLP transmission queue management module 222 is configured to maintain a TLP sending sequence number and a TLP sending link of each TLP transmission queue. The TLP transmission queue management module is configured to maintain the TLP sending sequence number and the TLP sending link of each TLP transmission queue, where the TLP sending sequence number of each TLP transmission queue represents a sending sequence number of a TLP already sent by the TTQ, and the TLP sending link represents an active or a standby sending link of the TTQ, so that the active sending link is used for sending the TLP.

Figure 13:
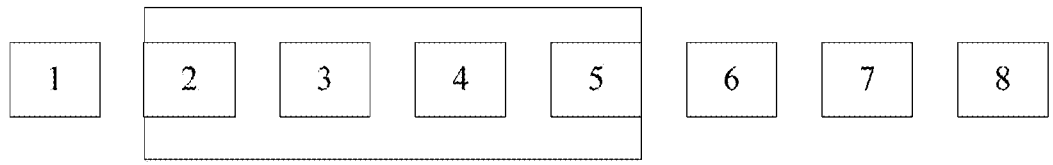
FIG. 13 is a schematic diagram of a sliding window of a TLP transmission queue according to an embodiment of the present invention.

Preferably, the TTQ may use a sliding window to send a TLP, thereby limiting the number of packets concurrently sent by each TTQ. A sliding window mechanism of the TTQ is shown in FIG. 13. Each box with a numeral in the figure represents a TLP. For example, a size of a sliding window is 4, that is, a maximum of 4 TLPs not acknowledged by the destination PEIC may coexist. After receiving a TLP acknowledgment packet returned by the destination PEIC, the acknowledgment module 226 moves the window forward according to the acknowledged SEQUENCE. For example, TLPs to be acknowledged in the current window are 2, 3, 4, and 5; if a received acknowledged SEQUENCE forwarded by the receive module is 2, the sliding window moves forward by one packet, and the TLPs to be acknowledged are 3, 4, and 5; the TTQ is allowed to send a TLP with a sequence number 6. According to a buffer capability of the PEIC, the size of the sliding window may be set to 2 to n (n is any positive integer). By setting the sliding window, the number of packets concurrently sent by each TTQ may be effectively controlled, processing efficiency is improved, and meanwhile, orderly and reliable sending and receiving are ensured.

Preferably, the destination PEIC of the third TLP receives the third TLP, and returns an acknowledgment TLP to the source PEIC according to the source PEIC number (SPEIC) in the third packet. Definitely, the destination PEIC may also receive multiple TLPs from the source PEIC and then send an acknowledgment TLP to the source PEIC. For example, if packets with sequence numbers 3, 4, and 5 and SPEICs 101 are received, only an acknowledgment TLP with a sequence number 5 may be sent, which indicates that all TLPs before the packet with the sequence number 5 are received, thereby reducing the number of acknowledgment TLPs. Preferably, the acknowledgment TLP may use ID routing, and the destination device ID is a device ID of the P2P module of the source PEIC. A self-defined TLP Prefix of the acknowledgment TLP includes the source PEIC number (SPEIC) and an acknowledged TLP sending sequence number (SEQUENCE), where the acknowledged TLP sending sequence number (SEQUENCE) is a latest TLP sending sequence number received by the source PEIC (which is generally the greatest, and may not be the greatest when the sequence numbers are used in a cycling manner). After receiving the acknowledgment TLP, the receive module forwards the acknowledgment TLP to the acknowledgment module 226, and the acknowledgment module 226 notifies, according to the acknowledged TLP sending sequence number and the SPEIC in the packet, the TTQ of deleting the third TLP in the queue. The TLP transmission queue management module of the source PEIC deletes, according to the acknowledged sequence number in the first acknowledgment message packet, the TLP buffered in the corresponding TTQ. Once the link from the PEIC to the PCIE switching unit fails or the PCIE switching unit fails, the TLP is discarded, and correspondingly, the source PEIC cannot receive the first acknowledgment message TLP which is for the third TLP and is returned by the destination PEIC in this case. After the source end PEIC times out, the third TLP buffered in the TTQ is sent again through the sending link connected to the PCIE switching unit; in this case, the failed link or the failed PCIE switching unit may be recovered, or the dual planes of the PEIC are switched, so the send module 223 of the source PEIC sends the third TLP again through the sending link connected to the PCIE switching unit, thereby ensuring that any TLP sent by the source PEIC is reliably sent to the destination PEIC.

Preferably, the acknowledgment module 226 is further configured to update the sliding window of the corresponding TTQ according to the acknowledged TLP sending sequence number (SEQUENCE) information and the source PEIC number (SPEIC) that are carried in the first acknowledgment message TLP.

Preferably, as shown in FIG. 12, the RTT module 22 may further include multiple TLP acknowledge sequences TAS. A structure and setting of the TLP acknowledge sequence in this embodiment are the same as those of the TLP acknowledge sequence in Embodiment 3 shown in FIG. 10. In a same manner, each TLP acknowledge sequence TAS corresponds to one transmission queue. For the specific structure and setting, reference may be made to the description of the related part in Embodiment 3 shown in FIG. 10, and details are not repeatedly described here.

The receive module 224 is further configured to receive a fourth TLP sent by the PCIE switching unit, and determine, according to a type of the TLP, whether the fourth TLP is an acknowledgment message TLP; if the fourth TLP is the acknowledgment message TLP, forward the fourth TLP to the acknowledgment module 226; if the fourth TLP is not the acknowledgment message TLP, buffer the received fourth TLP into a TLP acknowledge sequence TAS corresponding to a source PEIC of the fourth TLP.

In this case, the P2P module 21 is further configured to obtain the fourth TLP in the TLP acknowledge sequence TAS, and forward the fourth TLP to a destination RC/EP of the fourth TLP.

The RTT module 22 further includes a TLP acknowledge sequence management module 223, configured to, after the TLP acknowledge sequence receives the fourth TLP, notify the acknowledgment module 226 of returning an acknowledgment message TLP to a source PEIC.

The acknowledgment module 226 is further configured to generate a second acknowledgment message TLP, and buffer the second acknowledgment message TLP into a TLP transmission queue TTQ corresponding to the source PEIC, so that the second acknowledgment message TLP is scheduled and sent by the send module. Preferably, the acknowledgment module 226 sends an acknowledgment message TLP at a certain time interval or sends an acknowledgment message TLP after receiving a certain number of TLPs to be acknowledged (the number of TLPs to be acknowledged should not be greater than the number of windows).

Further, the P2P module 21 is configured to, before forwarding the third TLP to the reliable TLP transmission module RTT module 22 for processing, determine, according to a type of the received TLP, and a destination device ID or an access destination address in the packet, whether the third TLP needs to be forwarded to the reliable TLP transmission module RTT module for processing. The P2P module searches a corresponding address forwarding table or ID forwarding table according to the type of the received packet (address routing or ID routing). If a destination PEIC is configured in the address forwarding table or the ID forwarding table, it indicates that the third TLP needs to be forwarded to the reliable TLP transmission module RTT module for processing, and the third TLP is forwarded to the RTT for processing. Preferably, a TLP having a local address or a local ID may be directly returned to the RC or EP without the need of being forwarded to the RTT for processing.

In the current PCIE specifications, reliable transmission of a TLP is implemented through a point-to-point acknowledgment mechanism. For example, in FIG. 2, a switch 1 sends a TLP to a switch 2; the switch 1 saves the TLP, and does not delete the corresponding TLP until the switch 2 receives the correct TLP and returns acknowledgment information to the switch 1. However, for a TLP that is sent to the switch 2 by the RC, if a link between the switch 1 and the switch 2 fails, the packet that is already successfully sent to the switch 1 by the RC may be discarded due to the failure of the link between the switch 1 and the switch 2. However, the RC deems that the packet is sent successfully because the RC receives the acknowledgment information from the switch 1. Such failure causes that the RC cannot correctly sense a transmission result of the TLP, thereby causing a system abnormity or discarding of a data operation.

In the PCIE interface controller provided in the embodiment of the present invention, the third TLP carrying the source PEIC number and the sequence number of the sent TLP is sent to the PCIE switching unit through the sending link connected to the PCIE switching unit, the PCIE switching unit sends the received third TLP to the destination PEIC, the destination PEIC forwards the third TLP to the destination EP or the destination RC of the third TLP, and returns the first acknowledgment message TLP to the source PEIC according to the source PEIC number and the sequence number of the sent TLP, thereby completing transfer of the TLP. The source PEIC sends the third TLP again through a sending link of a sending queue connected to the PCIE switching unit if no first acknowledgment message TLP returned by the destination PEIC is received when time is out, thereby implementing reliable end-to-end transmission of a TLP in a case of a PCIE switching dual-plane networking connection, and improving reliability of a system using PCIE switching.

Figure 14:
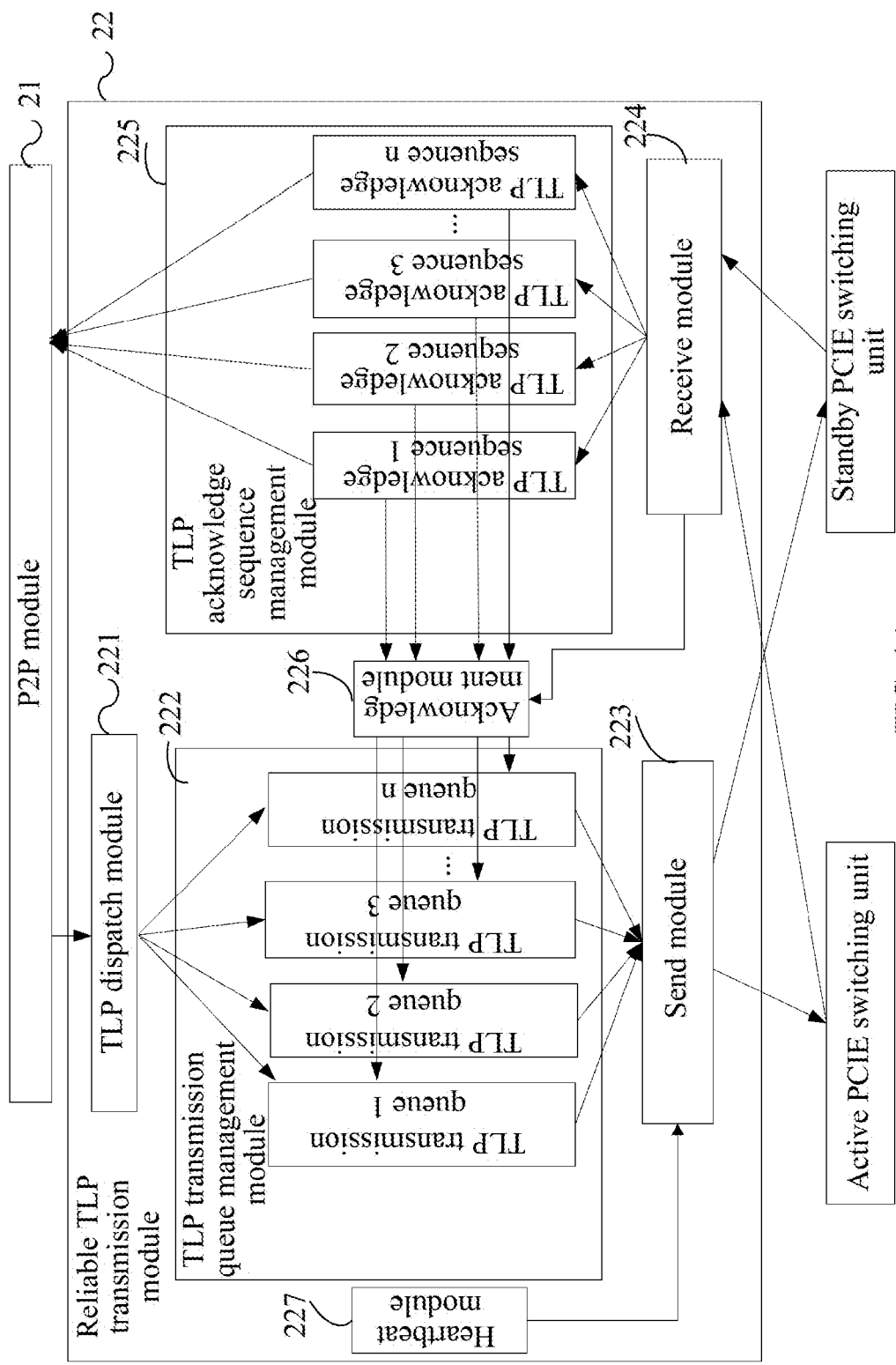
FIG. 14 is a structural diagram of a PCIE interface controller according to Embodiment 6 of the present invention.

FIG. 14 is a structural diagram of a PCIE interface controller according to Embodiment 6 of the present invention. As shown in the figure, the reliable TLP transmission RTT module 22 further includes a heartbeat module 227 configured to send fixed-time detection TLPs to all other PEICs at a time interval, and for a destination PEIC from which no returned detection reply TLP is received in specified time, notify a TLP sending queue management module 222 of updating a sending link of a corresponding TTQ. The TLP transmission queue management module 222 is further configured to update the sending link of the corresponding TLP transmission queue according to the notification of the heartbeat module 227.

Preferably, the heartbeat module 227 is configured to send fixed-time detection TLPs to all other PEICs in a communication connection at a time interval (the time interval may be configured according to network conditions, for example, the time interval is set to a value between 10 us and 1 ms), and for a destination PEIC from which no returned detection reply TLP is received in specified time, switch active and standby links. The specified time may also be configured according to the network conditions, and is greater than a period from time when the fixed-time detection TLP is sent to time when the detection reply TLP should be received. If no detection reply TLP is received when the specified time expires, it indicates that a communication route to the destination PEIC has a problem, such as a link failure or a failure of the PCIE switching unit. In this case, the heartbeat module notifies the TLP sending queue management module 222 of updating the sending link of the corresponding TTQ, that is, whether the TLP is sent through the active link or the standby link.

In the embodiment of the present invention, the heartbeat module sends a detection packet, thereby implementing failure detection on a link between PEICs, ensuring automatic switching of the active and standby planes, and further ensuring reliable packet transmission in a PCIE dual-plane switching network.

Figure 15:
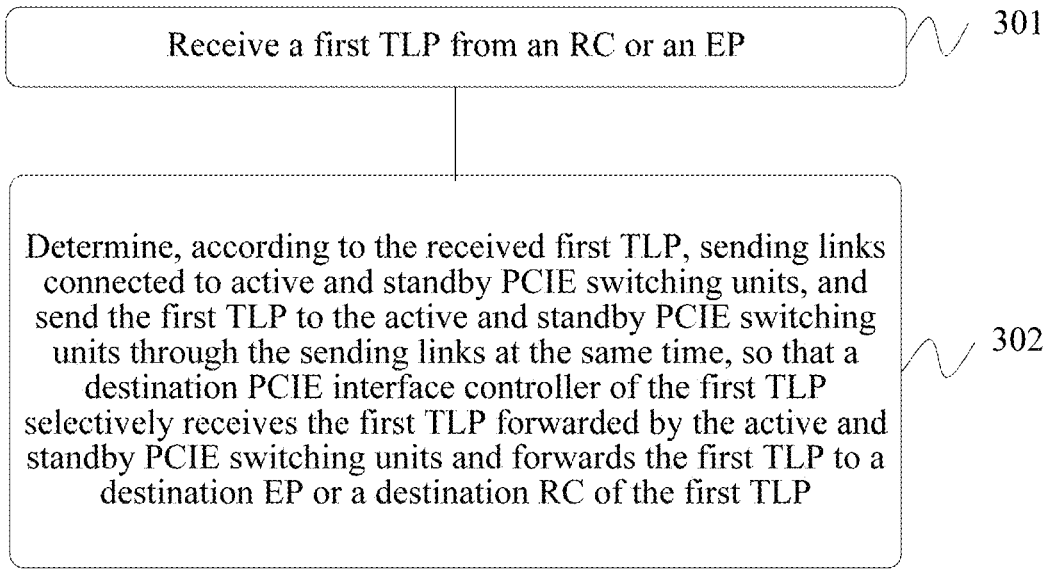
FIG. 15 is a flow chart of a method for packet transmission in a PCIE switching network according to Embodiment 7 of the present invention.

FIG. 15 is a flow chart of a method for packet transmission in a PCIE switching network according to Embodiment 7 of the present invention. As shown in the figure, the method is:

Step 301: Receive a first TLP from an RC or an EP.

Step 302: Determine, according to the received first TLP, sending links connected to active and standby PCIE switching units, and send the first TLP to the active and standby PCIE switching units through the sending links at the same time, so that a destination PCIE interface controller of the first TLP selectively receives the first TLP forwarded by the active and standby PCIE switching units and forwards the first TLP to a destination EP or a destination RC of the first TLP.

Preferably, the PCIE interface controller determines, according to the received first TLP, the sending links connected to the active and standby PCIE switching units, which specifically is: After receiving the first TLP, the PCIE interface controller searches a corresponding address forwarding table or ID forwarding table according to a type of the TLP, that is, whether the packet is routed through an address or an identity (ID), obtains a destination PEIC number corresponding to the first TLP, so as to determine the sending links of the active and standby PCIE switching units corresponding to the packet and send the first TLP to the active and standby PCIE switching units through the sending links at the same time. In this case, the active and standby PCIE switching units send the received first TLP to a destination PEIC, and the destination PEIC selectively receives the first TLP, for example, receives a first TLP that arrives earlier and discards a first TLP that arrives later, and forwards the received first TLP to the destination EP or the destination RC of the first TLP.

Further, before the first TLP is sent to the active and standby PCIE switching units through the sending links at the same time, the method further includes: encapsulating the first TLP, and adding a source PEIC number and a TLP sending sequence number in a self-defined end-to-end TLP prefix of the first TLP, so that the destination PEIC selectively receives, according to the source PEIC number and the TLP sending sequence number, the first TLP forwarded by the active and standby PCIE switching units, where the TLP sending sequence number is a sequence number of a TLP sent by the source PEIC to the destination PEIC of the first TLP. The selectively receiving, according to the source PEIC number and the TLP sending sequence number, the first TLP forwarded by the active and standby PCIE switching units is, for first packets which are forwarded by the active and standby PCIE switching units and have a same source PEIC number and a same TLP sending sequence number, receiving only a first TLP that arrives earlier.

In the method for packet transmission in a PCIE dual-plane switching network provided in the embodiment of the present invention, the PCIE interface controller PEIC sends the first TLP to the active and standby PCIE switching units through the sending links connected to the active and standby PCIE switching units at the same time, and the destination PEIC of the first TLP selectively receives the first TLP forwarded by the active and standby PCIE switching units and sends the first TLP to the destination EP or the destination RC of the first TLP, thereby implementing reliable transmission of a TLP in a case of a PCIE switching dual-plane networking connection, and improving reliability of a system using PCIE switching.

Figure 16:
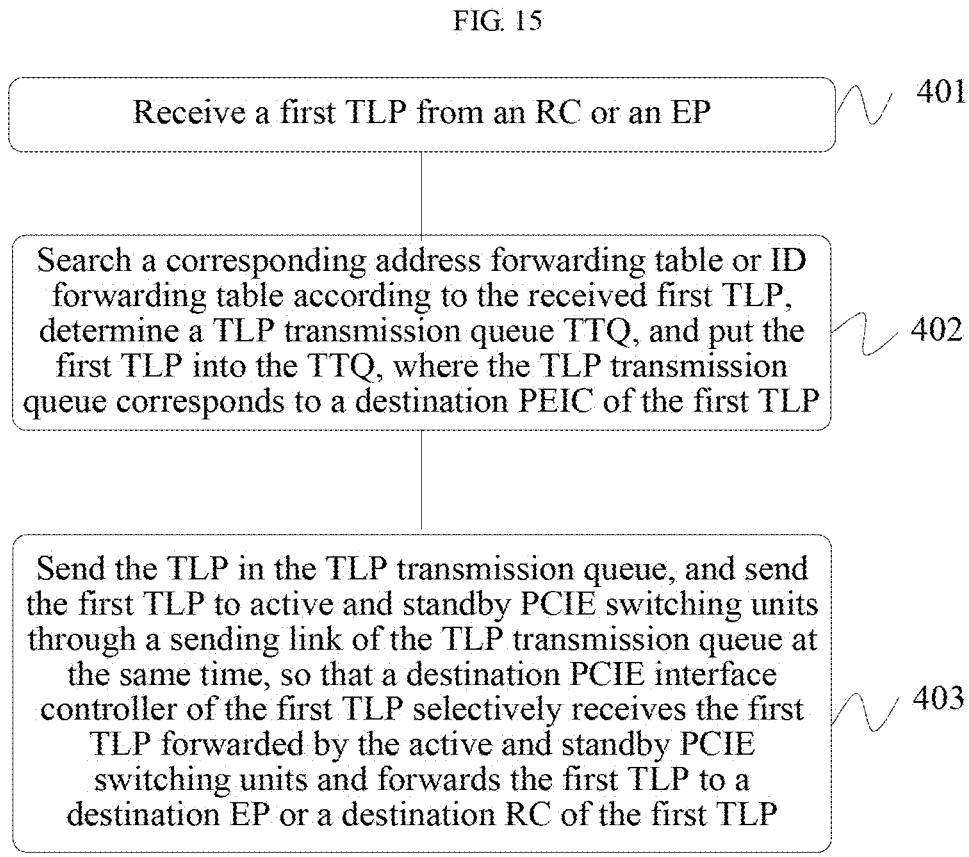
FIG. 16 is a flow chart of a method for packet transmission in a PCIE switching network according to Embodiment 8 of the present invention.

FIG. 16 is a flow chart of a method for packet transmission in a PCIE switching network according to Embodiment 8 of the present invention. As shown in the figure:

Step 401: Receive a first TLP from an RC or an EP.

Step 402: Search a corresponding address forwarding table or ID forwarding table according to the received first TLP, determine a TLP transmission queue TTQ, and put the first TLP into the TTQ, where the TLP transmission queue corresponds to a destination PEIC of the first TLP.

Specifically, a PCIE interface controller searches the corresponding address forwarding table or ID forwarding table according to a routing manner of the TLP (address routing or ID routing), and obtains a destination PEIC number according to a table searching result.

The address forwarding table may be shown in FIG. 6; the ID forwarding table may use the format shown in FIG. 7. Specific content and a configuration method are the same as those in the description in the foregoing Embodiment 2 and Embodiment 3, and details are not repeatedly described here. Preferably, the address forwarding table and the ID forwarding table are configured on the PCIE interface controller.

The PCIE interface controller further includes multiple TLP transmission queues. A function and structure of the TLP transmission queue in this embodiment are the same as those of the TLP transmission queue in Embodiment 2 shown in FIG. 5. For specific description, reference may be made to the related part, and details are not repeatedly described here.

Step 403: Send the TLP in the TLP transmission queue, and send the first TLP to active and standby PCIE switching units through a sending link of the TLP transmission queue at the same time, so that a destination PCIE interface controller of the first TLP selectively receives the first TLP forwarded by the active and standby PCIE switching units and forwards the first TLP to a destination EP or a destination RC of the first TLP.

The PCIE interface controller schedules the first TLP in the TLP transmission queue TTQ, encapsulates the TLP, adds a self-defined end-to-end TLP prefix (Prefix), and sends the encapsulated first TLP to the active and standby PCIE switching units through the sending link of the TTQ at the same time. A definition of a format of the TLP is as shown in FIG. 9: According to the definition in the PCIE specifications, a TLP may include 0 or multiple standard self-defined TLP prefixes. The TLP Prefix may implement parameter transfer of end-to-end expansion and point-to-point expansion, and implement function expansion. The TLP Prefix is further classified into local and end-to-end TLP Prefixes. A TLP Header defines a standard header part of the TLP, a Data Payload is a data part of the TLP, and a TLP Digest is a digest part of the TLP; the three parts are standard content in the PCIE specifications. Preferably, in the embodiment, transfer of a source PEIC number (SPEIC) and a TLP sending sequence number (SEQUENCE) from a source PEIC to the destination PEIC is implemented by using a self-defined end-to-end TLP Prefix. The SEQUENCE is a sequence number of a TLP sent by the source PEIC to the destination PEIC, namely, a sequence number of a TLP sent to the destination PEIC corresponding to the TLP transmission queue, and is sequenced independently in each TTQ, so that the destination PEIC sequences and acknowledges the received TLP according to the SPEIC+SEQUENCE, thereby implementing selectively receiving of the first TLP transferred by the active and standby PCIE switching units. The PCIE interface controller sends the first TLP to the active and standby PCIE switching units through two links. After the packet is sent, the TLP sending sequence number (SEQUENCE) of the TTQ is increased by 1. The destination PEIC selects a first TLP received earlier through the active and standby links, sends the first TLP received earlier to the destination EP or the destination RC, and discards a first TLP received later; that is, for TLPs having a same SPEIC+SEQUENCE, only a TLP that arrives earlier is received. After receiving the first TLP, the destination PEIC sends the first TLP to the destination EP or the destination RC of the first TLP, thereby completing reliable and orderly transmission of the TLP.

Further, the PCIE interface controller also maintains and manages a TLP sending sequence number and a TLP sending link of each TLP transmission queue.

Further, the destination PEIC of the first TLP selectively receives the packet sent by the active and standby PCIE switching units, and forwards the received first TLP to the destination RC/EP of the first TLP. Preferably, the destination PEIC of the first TLP may perform selective receiving according to the SPEIC and SEQUENCE that are carried in the self-defined TLP prefix in the first TLP sent by the active and standby PCIE switching units, that is, for first TLPs which are successively received through the two links and have the same SPEIC and SEQUENCE, only the first TLP received earlier is selected and sent to the destination RC/EP of the first TLP, and the first TLP received later is discarded.

Preferably, the PEIC may further include multiple TLP acknowledge sequences TAS, and each TLP acknowledge sequence TAS corresponds to a transmission queue of a source PEIC (the transmission queue of the source PEIC here refers to a transmission queue which corresponds to the PEIC and is in another PEIC that sends a TLP to the PEIC). A function and structure of the TLP acknowledge sequence in this embodiment are the same as those of the TLP acknowledge sequence in Embodiment 3 shown in FIG. 10. For specific description, reference may be made to the related part, and details are not repeatedly described here. In this embodiment, the PCIE also maintains and manages an expected sequence number of a TLP expected to be received by each TLP acknowledge sequence.

Further, the PCIE interface controller also determines, according to a type of the received packet, and a destination device ID or an access destination address in the packet, whether the first TLP needs to be buffered into the TLP transmission queue for processing. The PCIE interface controller searches a corresponding address forwarding table or ID forwarding table according to the type of the received packet (address routing or ID routing). If a destination PEIC is configured in the address forwarding table or the ID forwarding table, it indicates that forwarding processing is required, and the first TLP is buffered into the TLP transmission queue for subsequent processing. Preferably, a TLP having a local address or a local ID may be directly returned to the RC or EP without the need of being forwarded to the RTT for processing.

In the method for packet transmission in a PCIE dual-plane switching network provided in the embodiment of the present invention, the PCIE interface controller PEIC determines the TLP transmission queue according to the destination PEIC of the TLP, and sends the TLP to the active and standby PCIE switching units through the sending link of the corresponding TLP transmission queue at the same time, the active and standby PCIE switching units forward the first TLP to the destination PEIC of the first TLP, and the destination PEIC selectively receives the first TLP according to the source PEIC number and the TLP sending sequence number that are carried in the first TLP, sends the first TLP received earlier to the destination EP or the destination RC, and discards the first TLP received later, thereby completing reliable transmission of TLPs, implementing PCIE dual-plane networking, and improving reliability of a system using PCIE switching.

FIG. 17 is a flow chart of a method for packet transmission in a PCIE switching network according to Embodiment 9 of the present invention. As shown in the figure, the method includes:

Step 501: Receive a third TLP from an RC or an EP.

Step 502: Determine, according to the received third TLP, a sending link connected to a PCIE switching unit, send the third TLP to the PCIE switching unit through the sending link, so that a destination PCIE interface controller of the third TLP receives the third TLP forwarded by the PCIE switching unit and sends the third TLP to a destination EP or a destination RC of the third TLP; and send the third TLP again through the sending link connected to the PCIE switching unit if no first acknowledgment message TLP returned by the destination PEIC of the third TLP and forwarded by the PCIE switching unit is received when time is out.

Preferably, after receiving the third TLP, the PCIE interface controller PEIC searches a corresponding address forwarding table or ID forwarding table according to a type of the TLP, that is, whether the packet is routed through an address or an identity (ID), and obtains a destination PEIC number corresponding to the third TLP, so as to determine a sending link of the PCIE switching unit corresponding to the packet and send the third TLP to the PCIE switching unit through the sending link. In this case, the PCIE switching unit sends the received third TLP to the destination PEIC, so that the destination PEIC receives the third TLP, and forwards the third TLP to the destination EP or the destination RC of the third TLP. Meanwhile, the destination PEIC returns a first acknowledgment message TLP for the third TLP, and the first acknowledgment message TLP is forwarded by the PCIE switching unit to a source PCIE interface controller, so as to indicate that the third TLP is received. The source PCIE interface controller sends the third TLP again through a sending link connected to the PCIE switching unit (in a case of dual planes, a sending link connected to the PCIE switching unit in this case may be different from that through which the third TLP is sent at previous time) if no first acknowledgment message TLP returned by the destination PEIC is received when time is out.

Further, before the third TLP is sent to the PCIE switching unit through the sending link, the method further includes: encapsulating the third TLP, and adding a source PEIC number and a TLP sending sequence number in a self-defined end-to-end TLP prefix of the third TLP, so that the destination PEIC of the third TLP returns a first acknowledgment message TLP according to the source PEIC number and the TLP sending sequence number that are in the third TLP, where an end-to-end TLP prefix of the returned first acknowledgment message TLP carries a PEIC number of the destination PEIC of the third TLP and an acknowledged TLP sending sequence number. The TLP sending sequence number in the third TLP is a sequence number of a TLP sent by a source PEIC of the third TLP to the destination PEIC of the third TLP, and the acknowledged TLP sending sequence number in the first acknowledgment message TLP is a TLP sending sequence number which is of the source PEIC and is of the third TLP already received by the destination PEIC of the third TLP.

In the current PCIE specifications, reliable transmission of a TLP is implemented through a point-to-point acknowledgment mechanism. For example, in FIG. 2, a switch 1 sends a TLP to a switch 2; the switch 1 saves the TLP, and does not delete the corresponding TLP until the switch 2 receives the correct TLP and returns acknowledgment information to the switch 1. However, for a TLP that is sent to the switch 2 by the RC, if a link between the switch 1 and the switch 2 fails, the packet that is already successfully sent to the switch 1 by the RC may be discarded due to the failure of the link between the switch 1 and the switch 2. However, the RC deems that the packet is sent successfully because the RC receives the acknowledgment information from the switch 1. Such failure causes that the RC cannot correctly sense a transmission result of the TLP, thereby causing a system abnormity or discarding of a data operation.

In the method for packet transmission in a PCIE switching network provided in the embodiment of the present invention, the third TLP is sent to the PCIE switching unit through the sending link connected to the PCIE switching unit, the PCIE switching unit sends the received third TLP to the destination PEIC, and the destination PEIC forwards the third TLP to the destination EP or the destination RC of the third TLP, and returns the first acknowledgment message TLP to the source PEIC. The source PEIC sends the third TLP again through the sending link connected to the PCIE switching unit if no first acknowledgment message TLP returned by the destination PEIC is received when time is out, thereby implementing reliable end-to-end transmission of a TLP in a case of a PCIE switching dual-plane networking connection, and improving reliability of a system using PCIE switching.

Figure 18:
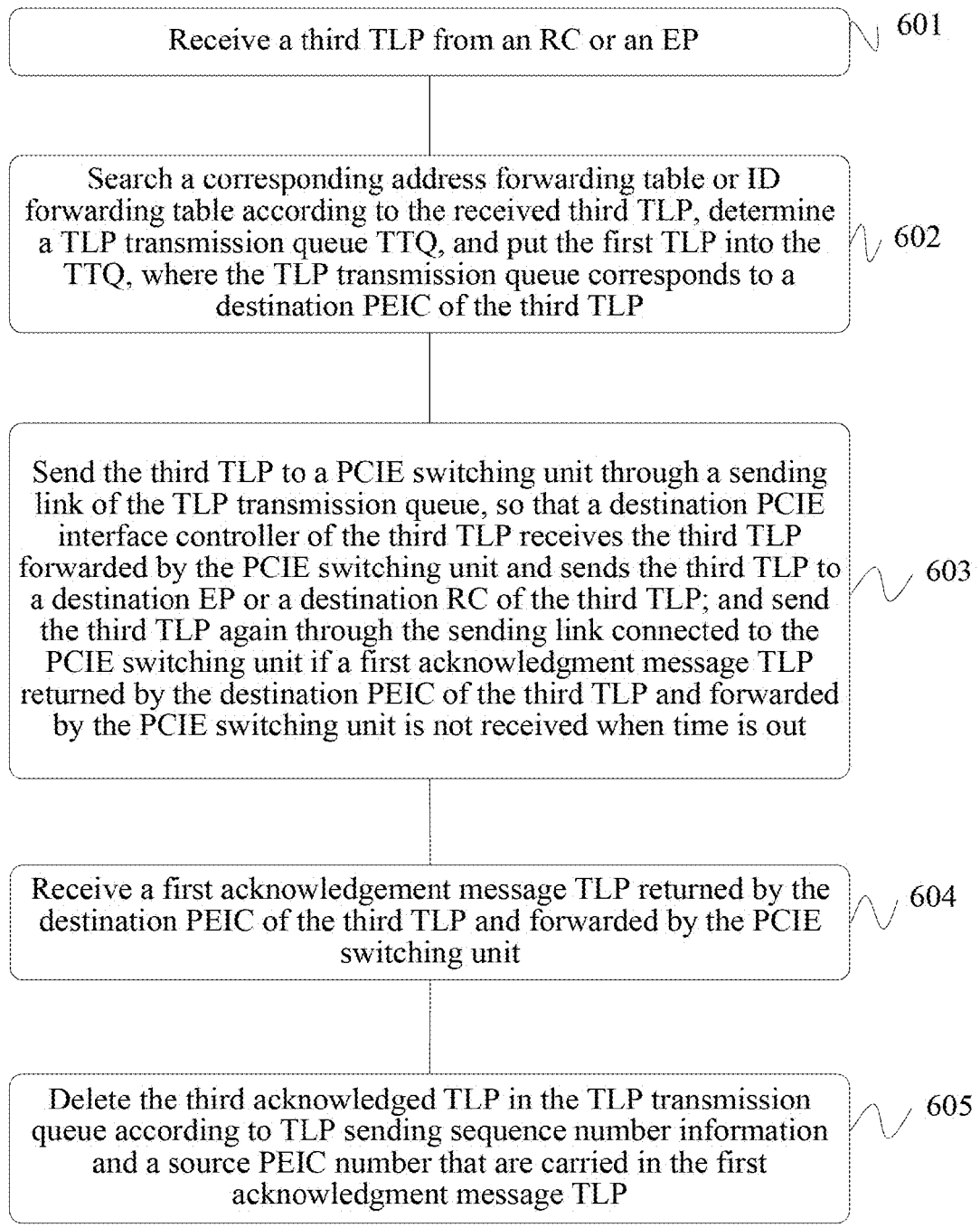
FIG. 18 is a flow chart of a method for packet transmission in a PCIE switching network according to Embodiment 10 of the present invention.

FIG. 18 is a flow chart of a method for packet transmission in a PCIE switching network according to Embodiment 10 of the present invention. As shown in the figure, the method specifically includes:

Step 601: Receive a third TLP from an RC or an EP.

Step 602: Search a corresponding address forwarding table or ID forwarding table according to the received third TLP, determine a TLP transmission queue TTQ, and put the first TLP into the TTQ, where the TLP transmission queue corresponds to a destination PEIC of the third TLP.

Preferably, a PCIE interface controller searches a corresponding address forwarding table or ID forwarding table according to a routing manner (address routing or ID routing) of the received third TLP, obtains a destination PEIC number according to a table searching result, and buffers the received third TLP into the corresponding TTQ. The address forwarding table may be shown in FIG. 6; the ID forwarding table may use the format shown in FIG. 7. Specific content and a configuration method are the same as those in the description in the foregoing Embodiment 2 and Embodiment 3, and details are not repeatedly described here.

As shown in FIG. 12, the RTT module 22 further includes multiple TLP transmission queues. A function and structure of the TLP transmission queue in this embodiment are the same as those of the TLP transmission queue in Embodiment 2 shown in FIG. 5. For specific description, reference may be made to the related part, and details are not repeatedly described here.

Step 603: Send the third TLP to a PCIE switching unit through a sending link of the TLP transmission queue, so that a destination PCIE interface controller of the third TLP receives the third TLP forwarded by the PCIE switching unit and forwards the third TLP to a destination EP or a destination RC of the third TLP; and send the third TLP again through the sending link connected to the PCIE switching unit if no first acknowledgment message TLP returned by the destination PEIC of the third TLP and forwarded by the PCIE switching unit is received when time is out.

Preferably, the PCIE interface controller schedules the TLP in the TLP transmission queue TTQ, encapsulates the TLP, adds a self-defined TLP prefix (Prefix), and sends the encapsulated third TLP to the PCIE switching unit through the sending link of the TTQ. A definition of a format of the TLP is as shown in FIG. 9: For the related definition of the specific structure, reference may be made to the description about the format of the TLP in FIG. 9 in the foregoing Embodiment 2 and Embodiment 3, and details are not repeatedly described here. Preferably, in the embodiment, transfer of the source PEIC number (SPEIC) and the TLP sending sequence number (SEQUENCE) from the source PEIC to the destination PEIC is implemented by using the self-defined end-to-end TLP Prefix in the TLP. The SEQUENCE is a sequence number of a TLP sent by the source PEIC to the destination PEIC, namely, a sequence number of a TLP sent to the destination PEIC corresponding to the TLP transmission queue, and is sequenced independently in each TTQ, so that the destination PEIC sequences and acknowledges the received TLP according to the SPEIC and the SEQUENCE. The end-to-end TLP prefix of the returned first acknowledgment message TLP carries the source PEIC number an acknowledged TLP sending sequence number, where the acknowledged TLP sending sequence number is a sending sequence number of a TLP already received by the destination PEIC from the source PEIC, thereby implementing returning of a first acknowledgment message in response to the received third TLP transferred by the PCIE switching unit. The PEIC sends the third TLP to the PCIE switching unit through the sending link of the TTQ. After the packet is sent, the TLP sending sequence number (SEQUENCE) of the TTQ is increased by 1.

Further, a TLP sending sequence number and a TLP sending link of each TLP transmission queue need to be maintained. The PEIC maintains the TLP sending sequence number and the TLP sending link of each TLP transmission queue, where the TLP sending sequence number of each TLP transmission queue represents a sending sequence number of a TLP already sent by the TTQ, and the TLP sending link represents an active or a standby sending link of the TTQ, so that the active sending link is used for sending the TLP.

Step 604: Receive the first acknowledgment (ACK) message TLP returned by the destination PEIC of the third TLP and forwarded by the PCIE switching unit.

Step 605: Delete the acknowledged third TLP in the TLP transmission queue according to TLP sending sequence number (SEQUENCE) information and a source PEIC number (SPEIC) that are carried in the first acknowledgment message TLP.

Preferably, the TTQ may use a sliding window to send a TLP, thereby limiting the number of packets concurrently sent by each TTQ. A sliding window mechanism of the TTQ is shown in FIG. 13. Each box with a numeral in the figure represents a TLP. For example, a size of a sliding window is 4, that is, a maximum of 4 TLPs not acknowledged by the destination PEIC may coexist. After a TLP acknowledgment packet returned by the destination PEIC is received, the sliding window moves forward according to the acknowledged SEQUENCE. For example, TLPs to be acknowledged in the current window are 2, 3, 4, and 5; if an acknowledged SEQUENCE in the received acknowledgment message TLP is 2, the sliding window moves forward by one packet, and the TLPs to be acknowledged are 3, 4, 5, and 6 in the current window. According to a buffer capability of the PEIC, the size of the sliding window may be set to 2 to n (n is any positive integer). By setting the sliding window, the number of packets concurrently sent by each TTQ may be effectively controlled, processing efficiency is improved, and meanwhile, orderly and reliable sending and receiving are ensured.

Preferably, the destination PEIC of the third TLP receives the third TLP, and returns an acknowledgment TLP to the source PEIC according to the source PEIC number (SPEIC) in the third packet. Definitely, the destination PEIC may also receive multiple TLPs from the source PEIC and then send an acknowledgment TLP to the source PEIC. For example, if packets with sequence numbers 3, 4, and 5 and SPEICs 101 are received, only an acknowledgment TLP with a sequence number 5 may be sent, which indicates that all TLPs before the packet with the sequence number 5 are received, thereby reducing the number of acknowledgment TLPs. Preferably, the acknowledgment TLP may use ID routing. A self-defined TLP Prefix of the acknowledgment TLP includes the source PEIC number (SPEIC) and an acknowledged TLP sending sequence number (SEQUENCE), where the acknowledged TLP sending sequence number (SEQUENCE) is a latest TLP sending sequence number received by the source PEIC (which is generally the greatest, and may not be the greatest when the sequence numbers are used in a cycling manner). After receiving the acknowledgment TLP, the source PEIC deletes the third TLP in the queue according to the acknowledged TLP sending sequence number and the SPEIC that are in the packet. The PCIE interface controller deletes, according to the acknowledged sequence number in the first acknowledgment packet, the TLP buffered in the corresponding TTQ. Once the link from the PEIC to the PCIE switching unit fails or the PCIE switching unit fails, the TLP is discarded, and correspondingly, the source PEIC cannot receive the first acknowledgment message TLP which is for the third TLP and is returned by the destination PEIC in this case. After the source end PEIC times out, the third TLP buffered in the TTQ is sent again through the sending link connected to the PCIE switching unit; in this case, the failed link or the failed PCIE switching unit may be recovered, or the dual planes of the PEIC are switched, so the source PEIC sends the third TLP again through the sending link connected to the PCIE switching unit, thereby ensuring that any TLP sent by the source PEIC is reliably sent to the destination PEIC.

Further, the sliding window of the corresponding TTQ is updated according to the sending sequence number (SE- QUENCE) information and the source PEIC number (SPEIC) that are carried in the first acknowledgment message TLP.

Preferably, as shown in FIG. 12, the PEIC may further include multiple TLP acknowledge sequences TAS. A structure and setting of the TLP acknowledge sequence in this embodiment are the same as those of the TLP acknowledge sequence in Embodiment 3 shown in FIG. 10. In a same manner, each TLP acknowledge sequence TAS corresponds to one transmission queue. For the specific structure and setting, reference may be made to the description of the related part in Embodiment 3 shown in FIG. 10, and details are not repeatedly described here.

Further, in step 604, before receiving the first acknowledgment (ACK) message TLP returned by the destination PEIC of the third TLP and forwarded by the PCIE switching unit, the PEIC receives a fourth TLP sent by the PCIE switching unit, distinguishes, according to a type of the TLP, whether the fourth TLP is an acknowledgment message TLP, and if the fourth TLP is not the acknowledgment message TLP, forwards the received fourth TLP to a destination RC or a destination EP of the fourth TLP. Specifically, the received fourth TLP may be buffered into a TLP acknowledge sequence TAS corresponding to a source PEIC of the fourth TLP, so as to be scheduled and forwarded to a destination RC or a destination EP of the fourth TLP subsequently. Further, an acknowledgment message TLP is returned to the source PEIC of the fourth TLP. Specifically, the acknowledgment message TLP for the fourth TLP is generated and buffered in a corresponding TLP transmission queue TTQ, so as to be scheduled and sent. Preferably, an acknowledgment message TLP may be sent at a certain time interval or an acknowledgment message TLP may be sent after a certain number of TLPs to be acknowledged are received (the number of TLPs to be acknowledged should not be greater than the number of windows).

In the current PCIE specifications, reliable transmission of a TLP is implemented through a point-to-point acknowledgment mechanism. For example, in FIG. 2, a switch 1 sends a TLP to a switch 2; the switch 1 saves the TLP, and does not delete the corresponding TLP until the switch 2 receives the correct TLP and returns acknowledgment information to the switch 1. However, for a TLP that is sent to the switch 2 by the RC, if a link between the switch 1 and the switch 2 fails, the packet that is already successfully sent to the switch 1 by the RC may be discarded due to the failure of the link between the switch 1 and the switch 2. However, the RC deems that the packet is sent successfully because the RC receives the acknowledgment information from the switch 1. Such failure causes that the RC cannot correctly sense a transmission result of the TLP, thereby causing a system abnormality or discarding of a data operation.

In the method for packet transmission in a PCIE switching network provided in the embodiment of the present invention, the third TLP carrying the source PEIC number and the sequence number of the sent TLP is sent to the PCIE switching unit through the sending link connected to the PCIE switching unit, the PCIE switching unit sends the received third TLP to the destination PEIC, and the destination PEIC forwards the third TLP to the destination EP or the destination RC of the third TLP, and returns the first acknowledgment message TLP to the source PEIC according to the source PEIC number and the sequence number of the sent TLP, thereby completing transfer of the TLP. The source PEIC sends the third TLP again through the sending link connected to the PCIE switching unit if no first acknowledgment message TLP returned by the destination PEIC is received when time is out, thereby implementing reliable end-to-end transmission of a TLP in a case of a PCIE switching dual-plane networking connection, and improving reliability of a system using PCEI switching.

Further, the method for packet transmission in a PCIE switching network includes: sending fixed-time detection TLPs to all other PEICs at a time interval, and if no detection reply TLP returned by a destination PEIC is received in specified time, updating a sending link of a corresponding TLP transmission queue. The PCIE interface controller sends fixed-time detection TLPs to all other PEICs in a communication connection at a time interval (the time interval may be configured according to network conditions, for example, the time interval is set to a value between 10 us and 1 ms), and for a destination PEIC from which no returned detection reply TLP is received in specified time, switches active and standby links. The specified time may also be configured according to the network conditions, and is greater than a period from time when the fixed-time detection TLP is sent to time when the detection reply TLP should be received. If no detection reply TLP is received when the specified time expires, it indicates that a communication route to the destination PEIC has a problem, such as a link failure or a failure of the PCIE switching unit. In this case, the sending link of the corresponding TTQ is updated, that is, whether the TLP is sent through the active link or the standby link.

In the embodiment of the present invention, a detection packet is sent, thereby implementing failure detection on a link between PEICs, ensuring automatic switching of active and standby planes, and further ensuring reliable packet transmission in a PCIE dual-plane switching network.

Figure 19:
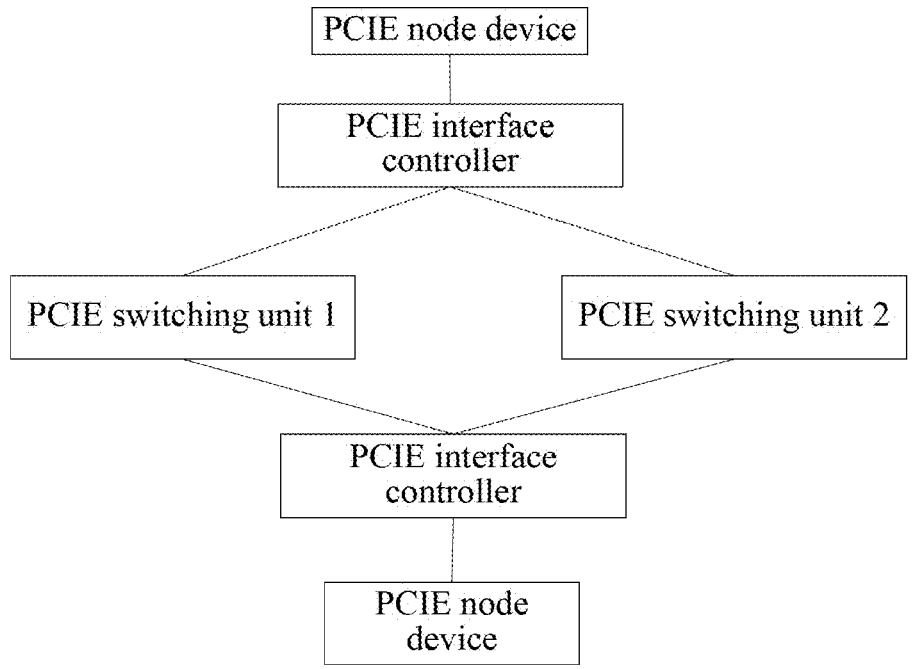
FIG. 19 is a diagram of a system for packet transmission in a PCIE switching network according to Embodiment 11 of the present invention.

FIG. 19 is a diagram of a system for packet transmission in a PCIE exchange network according to Embodiment 11 of the present invention. As shown in the figure, the system includes at least two PCIE node devices, at least two PCIE interface controllers PEIC, and two PCIE switching units, where each of the at least two PCIE node devices is connected to one of the at least two PCIE interface controllers, and each of the at least two PCIE interface controllers is connected to the two PCIE switching units respectively.

A first PCIE node device of the at least two PCIE node devices is configured to send a first TLP to a connected first PCIE interface controller of the at least two PCIE interface controllers.

The first PCIE interface controller is configured to receive the first TLP, determine, according to the received first TLP, sending links connected to the two PCIE switching units, and send the first TLP to the PCIE switching units through the sending links at the same time.

The PCIE switching unit is configured to forward the first TLP to a second PCIE interface controller of the at least two PCIE interface controllers, where the second PCIE interface controller is a destination PCIE interface controller of the first TLP.

The second PCIE interface controller is configured to selectively receive the first TLP forwarded by the PCIE switching units and send the first TLP to a second PCIE node device of the at least two PCIE node devices, where the second PCIE node device is a destination PCIE node device of the first TLP.

The second PCIE node device is configured to receive the first TLP forwarded by the second PCIE interface controller.

Preferably, the first PCIE interface controller is configured to, after receiving the first TLP, search a corresponding address forwarding table or ID forwarding table according to a type of the TLP, that is, whether the packet is routed through an address or an identity (ID), and obtain a destination PEIC number corresponding to the first TLP, so as to determine sending links of active and standby PCIE switching units corresponding to the packet, and send the first TLP to the two PCIE switching units through the sending links at the same time.

Further, the first PCIE interface controller encapsulates the first TLP, adds a source PEIC (a first PEIC here) number and a TLP sending sequence number in a self-defined TLP prefix (Prefix), and sends the encapsulated first TLP to the active and standby PCIE switching units through a sending link of the TTQ. A definition of a format of the TLP is as shown in FIG. 9. According to the definition in the PCIE specifications, a TLP may include 0 or multiple standard or self-defined TLP prefixes. The TLP Prefix may implement parameter transfer of end-to-end expansion and point-to-point expansion, and implement function expansion. The TLP Prefix is further classified into local and end-to-end TLP Prefixes. A TLP Header defines a standard header part of the TLP, a Data Payload is a data part of the TLP, and a TLP Digest is a digest part of the TLP; the three parts are standard content in the PCIE specifications. Preferably, in the embodiment, transfer of a source PEIC number (SPEIC) and a TLP sending sequence number (SEQUENCE) from a source PEIC to a destination PEIC is implemented by using a self-defined end-to-end TLP Prefix. The SEQUENCE is a sequence number of a TLP sent by the source PEIC to the destination PEIC, so that the destination PEIC sequences and acknowledges the received TLP according to the SPEIC and the SEQUENCE, thereby implementing selectively receiving of the first TLP transferred by the active and standby PCIE switching units. The first PCIE interface controller sends the first TLP to the active and standby PCIE switching units through two links. After the packet is sent, the TLP sending sequence number (SEQUENCE) is increased by 1.

Further, the second PEIC is configured to perform selective receiving according to the SPEIC and SEQUENCE that are carried in the self-defined TLP prefix in the first TLP sent by the active and standby PCIE switching units, that is, for first TLPs which are successively received through the two links and have a same SPEIC and a same SEQUENCE, only a first TLP received earlier is selected and sent to a destination RC/EP of the first TLP, and a first TLP received later is discarded.

Further, the two PCIE node devices may specifically be root complexes RC or endpoint devices EP, and each PCIE interface controller may be connected to one RC or at least one endpoint device EP.

In the system for packet transmission in a PCIE switching network provided in the embodiment of the present invention, the first PCIE interface controller sends the first TLP to the active and standby PCIE switching units through the sending links connected to the active and standby PCIE switching units at the same time, the destination PEIC of the first TLP selectively receives the first TLP forwarded by the active and standby PCIE switching units and sends the first TLP to the destination PCIE node device of the first TLP, thereby implementing reliable transmission of a TLP in a case of a PCIE switching dual-plane networking connection, and improving reliability of a system using PCIE switching.

Further, the first PCIE interface controller is configured to search a corresponding address forwarding table or ID forwarding table according the received first TLP, determine a TLP transmission queue TTQ, put the first TLP into the TTQ, where the TLP transmission queue corresponds to the destination PEIC of the first TLP; and send the TLP in the TTQ to the active and standby PCIE switching units through the sending link of the TLP transmission queue at the same time. Preferably, the first PCIE interface controller may search a corresponding address forwarding table or ID forwarding table according to a routing manner of the TLP (address routing or ID routing), and obtain a destination PEIC number according to a table searching result.

The address forwarding table may be shown in FIG. 6; the ID forwarding table may use the format shown in FIG. 7. Specific content and a configuration method are the same as those in the description in the foregoing Embodiment 2 and Embodiment 3, and details are not repeatedly described here. The address forwarding table and the ID forwarding table may be configured on the PEIC.

A function and structure of the TLP transmission queue in this embodiment are the same as those of the TLP transmission queue in Embodiment 2 shown in FIG. 5. For detailed description, reference may be made to the related part, and details are not repeatedly described here. Each TTQ saves a TLP sending sequence number (SEQUENCE) and a TLP sending link of the PEIC, where the TLP sending sequence number of the PEIC refers to a sequence number of the TLP sent to the PEIC. Each time the TLP transmission queue TTQ sends a TLP, the TLP sending sequence number of the PEIC of the TTQ is increased by 1. The TLP sending link refers to a communication link through which the queue sends a TLP to the destination PEIC; specifically, the TTQ may maintain the TLP sending link and save related information. Further, the first PCIE interface controller is configured to maintain and manage a TLP sending sequence number and a TLP sending link of each TLP transmission queue.

Preferably, the first PCIE interface controller schedules the first TLP in the TLP transmission queue TTQ, encapsulates the TLP, adds a self-defined end-to-end TLP prefix (Prefix), and sends the encapsulated first TLP to the active and standby PCIE switching units through the sending link of the TTQ at the same time. A definition of a format of the TLP is as shown in FIG. 9: According to the definition in the PCIE specifications, a TLP may include 0 or multiple standard or self-defined TLP prefixes. The TLP Prefix may implement parameter transfer of end-to-end expansion and point-to-point expansion, and implement function expansion. The TLP Prefix is further classified into local and end-to-end TLP Prefixes. A TLP Header defines a standard header part of the TLP, a Data Payload is a data part of the TLP, and a TLP Digest is a digest part of the TLP; the three parts are standard content in the PCIE specifications. Preferably, in the embodiment, transfer of a source PEIC number (SPEIC) and a TLP sending sequence number (SEQUENCE) from the source PEIC to the destination PEIC is implemented by using a self-defined end-to-end TLP Prefix. The SEQUENCE is a sequence number of a TLP sent by the source PEIC to the destination PEIC, namely, a sequence number of a TLP sent to the destination PEIC corresponding to the TLP transmission queue, and is sequenced independently in each TTQ, so that the destination PEIC sequences and acknowledges the received TLP according to the SPEIC+SEQUENCE, thereby implementing selectively receiving of the first TLP transferred by the active and standby PCIE switching units. The first PCIE interface controller sends the first TLP to the active and standby PCIE switching units through two links. After the packet is sent, the TLP sending sequence number (SEQUENCE) of the TTQ is increased by 1. The destination PEIC selects a first TLP received earlier through the active and standby links, sends the first TLP received earlier to the destination EP or the destination RC, and discards the first TLP received later, that is, for TLPs having the same SPEIC+SEQUENCE, only a TLP that arrives earlier is received. After receiving the first TLP, the destination PEIC sends the first TLP to the destination EP or the destination RC of the first TLP, thereby completing reliable and orderly transmission of a TLP. In the system for packet transmission in a PCIE switching network provided in the embodiment of the present invention, the first PCIE sends the TLP to the active and standby PCIE switching units at the same time, the active and standby PCIE switching units forward the first TLP to the destination PEIC, and the destination PEIC selectively receives the first TLP according to the source PEIC number and the TLP sending sequence number that are carried in the self-defined end-to-end TLP prefix of the first TLP, sends the first TLP received earlier to the destination EP or the destination RC, and discards the first TLP received later, thereby completing reliable transmission of the TLP, implementing PCIE dual-plane networking, and improving the reliability of the system using PCIE switching.

Further, the second PEIC is configured to perform selective receiving according to the SPEIC and SEQUENCE that are carried in the self-defined TLP prefix of the first TLP sent by the active and standby PCIE switching units, that is, for the first TLPs which are successively received through the two links and have the same SPEIC and SEQUENCE, only the first TLP received earlier is selected and sent to the destination RC/EP of the first TLP, and the first TLP received later is discarded.

Preferably, the second PEIC may further include multiple TLP acknowledge sequences TAS (TLP Acknowledge Sequence), and each TLP acknowledge sequence TAS corresponds to a transmission queue of a source PEIC (the transmission queue of the source PEIC here refers to a transmission queue which corresponds to the PEIC and is in another PEIC that sends a TLP to the PEIC). Each TAS has an expected sequence number, which represents a SEQUENCE that should be carried by a next TLP to be received from a corresponding source PEIC. For example, if a TLP acknowledge sequence 1 of a TLP interface controller 1 corresponds to a TLP transmission queue 1 of a TLP interface controller 2, the TAS 1 of the PEIC 1 records a SEQUENCE carried in a TLP expected to be received from the source end PEIC 2 and sent through the TTQ 1 of the PEIC 2. For example, if an expected sequence number of the TAS 1 of the PEIC 1 is 3, it indicates that a SEQUENCE of a next TLP that the PEIC 1 plans to receive from the source end PEIC 2 should be 3. Dynamic addition or deletion may be performed on a corresponding relationship between TASs and TTQs according to a change of TTQs. For example, when a new PEIC device is added into a network, a corresponding TTQ needs to be added, and a TAS also needs to be added. Preferably, the second PEIC receives the first TLP, determines a corresponding TAS according to the SPEIC in the self-defined TLP Prefix of the first TLP, compares the SEQUENCE in the first TLP with the expected sequence number in the TAS, if the SEQUENCE in the first TLP is equal to the expected sequence number in the TAS, sends the first TLP to the destination RC/EP of the first TLP and increases the expected sequence number of the TAS by 1; and if the SEQUENCE in the first TLP is not equal to the expected sequence number in the TAS, discards the TLP. Further, the second PEIC is configured to maintain and manage an expected sequence number of each TLP acknowledge sequence. In the system for packet transmission in a PCIE switching network provided in the embodiment of the present invention, the first TLP forwarded by the active and standby PCIE switching units is selectively received, only the first TLP received earlier is selected and sent to the destination RC/EP of the first TLP through the P2P module, and the first TLP received later is discarded, thereby completing reliable and orderly dual fed and selective receiving transmission of TLPs, implementing PCIE dual-plane networking, and improving the reliability of the system using PCIE switching.

Figure 20:
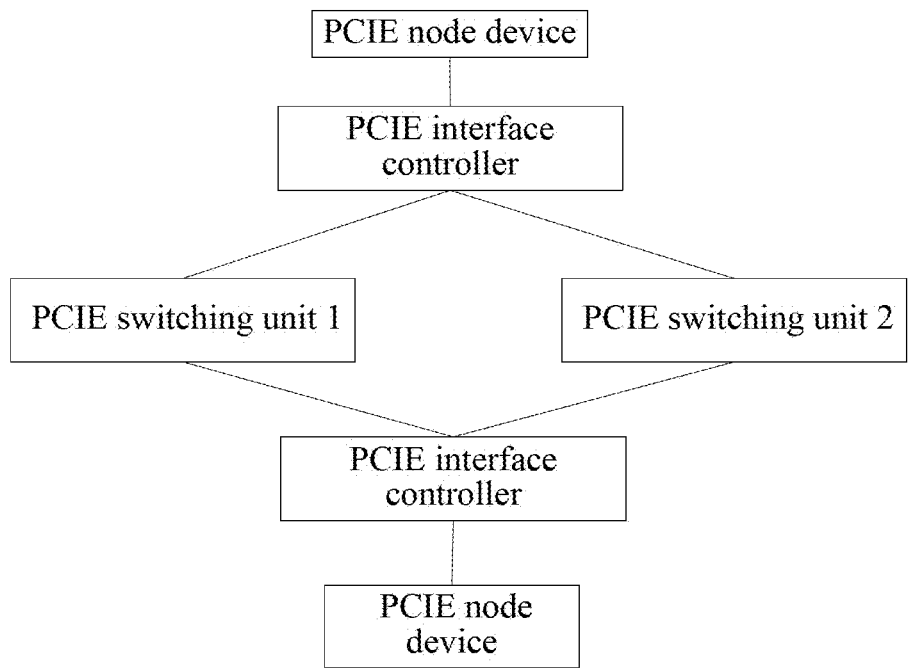
FIG. 20 is a diagram of a system for packet transmission in a PCIE switching network according to Embodiment 12 of the present invention.

FIG. 20 is a diagram of a system for packet transmission in a PCIE switching network according to Embodiment 12 of the present invention. As shown in the figure, the system includes at least two PCIE node devices, at least two PCIE interface controllers PEIC, and two PCIE switching units, where each of the at least two PCIE node devices is connected to one of the at least two PCIE interface controllers, and each of the at least two PCIE interface controllers is connected to the two PCIE switching units respectively.

A third PCIE node device in the at least two PCIE node devices is configured to send a third TLP to a connected third PCIE interface controller in the at least two PCIE interface controllers. The third PCIE interface controller is configured to receive the third TLP, determine, according to the received third TLP, a sending link connected to one of the two PCIE switching units, send the third TLP to the PCIE switching unit through the sending link, and send the third TLP to a fourth PCIE interface controller in the at least two PCIE interface controllers again through the sending link connected to the PCIE switching unit if no first acknowledgment message TLP returned by a destination PEIC of the third TLP and forwarded by the PCIE switching unit is received when time is out, where the fourth PCIE interface controller is a destination PCIE interface controller of the third TLP.

The PCIE switching unit is configured to forward the third TLP to the fourth PCIE interface controller, and forward the first acknowledgment message TLP returned by the fourth PCIE interface controller to the third PCIE interface controller.

The fourth PCIE interface controller is configured to receive the third TLP forwarded by the PCIE switching unit and send the third TLP to a fourth PCIE node device of the at least two PCIE node devices, where the second PCIE node device is a destination PCIE node device of the third TLP; and return the first acknowledgment message TLP to the third PCIE interface controller, so as to acknowledge that the third TLP is received.

The fourth PCIE node device of the at least two PCIE node devices is configured to receive the third TLP forwarded by the fourth PCIE interface controller.

Further, the two PCIE node devices may specifically be root complexes RC or endpoint devices EP, and each PCIE interface controller may be connected to one RC or at least one endpoint device EP.

Preferably, the third PCIE interface controller is configured to search a corresponding address forwarding table or ID forwarding table according to a type of the third TLP, that is, whether the packet is routed through an address or an identity (ID), obtain a destination PEIC number corresponding to the third TLP, so as to determine a sending link of the PCIE switching unit corresponding to the packet, and send the third TLP to the PCIE switching unit through the sending link. In this case, the PCIE switching unit sends the received third TLP to the destination PEIC, so that the destination PEIC receives the third TLP, and forwards the third TLP to the destination EP or the destination RC of the third TLP. Meanwhile, the destination PEIC returns a first acknowledgment message TLP for the third TLP, and the first acknowledgment message TLP is forwarded to the source PEIC (third PEIC) through the PCIE switching unit, so as to indicate that the third TLP is received. The third PEIC sends the third TLP again through a sending link connected to the PCIE switching unit (in a case of dual planes, a sending link connected to the PCIE switching unit in this case may be different from that through which the third TLP is sent at previous time) if no first acknowledgment message TLP returned by the destination PEIC is received when time is out.

In the current PCIE specifications, reliable transmission of a TLP is implemented through a point-to-point acknowledgment mechanism. For example, in FIG. 2, a switch 1 sends a TLP to a switch 2; the switch 1 saves the TLP, and does not delete the corresponding TLP until the switch 2 receives the correct TLP and returns acknowledgment information to the switch 1. However, for a TLP that is sent to the switch 2 by the RC, if a link between the switch 1 and the switch 2 fails, the packet that is already successfully sent to the switch 1 by the RC may be discarded due to the failure of the link between the switch 1 and the switch 2. However, the RC deems that the packet is sent successfully because the RC receives the acknowledgment information from the switch 1. Such failure causes that the RC cannot correctly sense a transmission result of the TLP, thereby causing a system abnormity or discarding of a data operation.

In the system for packet transmission in a PCIE switching network provided in the embodiment of the present invention, the third TLP is sent to the PCIE switching unit through the sending link connected to the PCIE switching unit, the PCIE switching unit sends the received third TLP to the destination PEIC, and the destination PEIC receives the third TLP and returns the first acknowledgment message TLP to the source PEIC. The source PEIC sends the third TLP again through the sending link connected to the PCIE switching unit if no first acknowledgment message TLP returned by the destination PEIC is received when time is out, thereby implementing reliable end-to-end transmission of a TLP in a case of a PCIE switching dual-plane networking connection, and improving reliability of a system using PCIE switching.

Further, the third PEIC is configured to search a corresponding address forwarding table or ID forwarding table according to the received third TLP, determine a TLP transmission queue TTQ, put the third TLP into the TTQ, where the TLP transmission queue corresponds to a destination PEIC (fourth PEIC) of the third TLP; and send the third TLP to the PCIE switching unit through the sending link of the TLP transmission queue.

Preferably, the third PEIC is configured to receive the third TLP, search the corresponding address forwarding table or ID forwarding table according to a routing manner (address routing or ID routing) of the TLP, obtain a destination PEIC number according to a table searching result, and buffer the received third TLP in the corresponding TTQ. The address forwarding table may be shown in FIG. 6; the ID forwarding table may use the format shown in FIG. 7. Specific content and a configuration method are the same as those in the description in the foregoing Embodiment 2 and Embodiment 3, and details are not repeatedly described here. As shown in FIG. 12, the RTT module 22 further includes multiple TLP transmission queues. A function and structure of the TLP transmission queue in this embodiment are the same as those of the TLP transmission queue in Embodiment 2 shown in FIG. 5. For specific description, reference may be made to the related part, and details are not repeatedly described here.

Further, the third PEIC is configured to receive a first acknowledgment message TLP returned by the destination PEIC of the third TLP and forwarded by the PCIE switching unit, and delete the acknowledged third TLP in the TLP transmission queue according to TLP sending sequence number information and a source PEIC number that are carried in the first acknowledgment message TLP.

Further, the third PEIC schedules the TLP in the TLP transmission queue TTQ, encapsulates the TLP, adds a self-defined TLP prefix (Prefix), and sends the encapsulated third TLP to the PCIE switching unit through the sending link of the TTQ. A definition of a format of the TLP is as shown in FIG. 9: For the related definition of the specific structure, reference may be made to the description about the format of the TLP in FIG. 9 in the foregoing Embodiment 2 and Embodiment 3, and details are not repeatedly described here. Preferably, in the embodiment, transfer of a source PEIC number (SPEIC) and a TLP sending sequence number (SEQUENCE) from the source PEIC to the destination PEIC is implemented by using a self-defined end-to-end TLP Prefix in the TLP. The SEQUENCE is a sequence number of a TLP sent by the source PEIC to the destination PEIC, namely, a sequence number of a TLP sent to the destination PEIC corresponding to the TLP transmission queue, and is sequenced independently in each TTQ, so that the destination PEIC sequences and acknowledges the received TLP according to the SPEIC and the SEQUENCE. The end-to-end TLP prefix of the returned first acknowledgment message TLP carries the source PEIC number and an acknowledged TLP sending sequence number, where the acknowledged TLP sending sequence number is a sending sequence number of a TLP already received by the destination PEIC from the source PEIC, thereby implementing returning of a first acknowledgment message in response to the received third TLP transferred by the PCIE switching unit. After the third PEIC sends the third TLP to the PCIE switching unit through the sending link of the TTQ, the TLP sending sequence number (SEQUENCE) of the TTQ is increased by 1.

Further, the third PEIC is configured to maintain a TLP sending sequence number and a TLP sending link of each TLP transmission queue. The TLP sending sequence number of each TLP transmission queue represents a sending sequence number of the TLP already sent by the TTQ, and the TLP sending link represents an active or a standby sending link of the TTQ, so that the active sending link is used for sending the TLP.

Preferably, the TTQ of the PEIC may use a sliding window to send a TLP, thereby limiting the number of packets concurrently sent by each TTQ. A sliding window mechanism of the TTQ is shown in FIG. 13. Each box with a numeral in the figure represents a TLP. For example, a size of a sliding window is 4, that is, a maximum of 4 TLPs not acknowledged by the destination PEIC may coexist. After receiving a TLP acknowledgment packet returned by the destination PEIC, the acknowledgment module 226 moves the window forward according to the acknowledged SEQUENCE. For example, TLPs to be acknowledged in the current window are 2, 3, 4, and 5; if a received acknowledged SEQUENCE forwarded by the receive module is 2, the sliding window moves forward by one packet, and the TLPs to be acknowledged are 3, 4, and 5; the TTQ is allowed to send a TLP with a sequence number 6. According to a buffer capability of the PEIC, the size of the sliding window may be set to 2 to n (n is any positive integer). By setting the sliding window, the number of packets concurrently sent by each TTQ may be effectively controlled, processing efficiency is improved, and meanwhile, orderly and reliable sending and receiving are ensured.

Preferably, the fourth PEIC may also receive multiple TLPs from the source PEIC and then send an acknowledgment TLP to the source PEIC. For example, if packets with sequence numbers 3, 4, and 5 and SPEICs 101 are received, only an acknowledgment TLP with a sequence number 5 may be sent, which indicates that all TLPs before the packet with the sequence number 5 are received, thereby reducing the number of acknowledgment TLPs. A self-defined TLP Prefix of the acknowledgment TLP includes the source PEIC number (SPEIC) and an acknowledged TLP sending sequence number (SEQUENCE), where the acknowledged TLP sending sequence number (SEQUENCE) is a latest TLP sending sequence number received by the source PEIC (which is generally the greatest, and may not be the greatest when the sequence numbers are used in a cycling manner). After receiving a fourth acknowledgment TLP, the third PEIC deletes the TLP buffered in the corresponding TTQ according to the acknowledged TLP sending sequence number and the SPEIC that are in the packet. Once the link from the PEIC to the PCIE switching unit fails or the PCIE switching unit fails, the TLP is discarded, and correspondingly, the third PEIC (source PEIC) cannot receive the first acknowledgment message TLP which is for the third TLP and is returned by the fourth PEIC (destination PEIC) in this case. After the source end PEIC times out, the third TLP buffered in the TTQ is sent again through the sending link connected to the PCIE switching unit; in this case, the failed link or the failed PCIE switching unit may be recovered, or the dual planes of the PEIC are switched, so it is ensured that any TLP sent by the source PEIC is reliably sent to the destination PEIC.

Further, the third PEIC is configured to update the sliding window of the corresponding TTQ according the sending sequence number (SEQUENCE) information and the source PEIC number (SPEIC) that are carried in the first acknowledgment message TLP.

Preferably, the third PEIC may further include multiple TLP acknowledge sequences TAS. A structure and setting of the TLP acknowledge sequence in this embodiment are the same as those of the TLP acknowledge sequence in Embodiment 3 shown in FIG. 10. In a same manner, each TLP acknowledge sequence TAS corresponds to one transmission queue. For the specific structure and setting, reference may be made to the description of the related part in Embodiment 3 shown in FIG. 10, and details are not repeatedly described here. Further, the fourth PEIC is further configured to receive the third TLP sent by the PCIE switching unit, distinguish, according to the type of the TLP, whether the third TLP is an acknowledgment message TLP, and if the third TLP is not the acknowledgment message TLP, buffer the received third TLP into a TLP acknowledge sequence TAS corresponding to the source PEIC of the third TLP, forward the third TLP to the destination RC/EP of the third TLP, and return a first acknowledgment message TLP. The fourth PEIC sends an acknowledgment message TLP at a time interval or send an acknowledgment message TLP after receiving a certain number of TLPs to be acknowledged (the number of TLPs to be acknowledged should not be greater than the number of windows).

In the system for packet transmission in a PCIE switching network provided in an embodiment of the present invention, the third TLP carrying the source PEIC number and the sequence number of the sent TLP is sent to the PCIE switching unit through the sending link connected to the PCIE switching unit, the PCIE switching unit sends the received third TLP to the destination PEIC, and the destination PEIC forwards the third TLP to the destination EP or the destination RC of the third TLP, and returns the first acknowledgment message TLP to the source PEIC according to the source PEIC number and the sequence number of the sent TLP, thereby completing transfer of the TLP. The source PEIC sends the third TLP again through a sending link of a sending queue connected to the source PCIE switching unit if no first acknowledgment message TLP returned by the destination PEIC is received when time is out, thereby implementing reliable end-to-end transmission of a TLP in a case of a PCIE switching dual-plane networking connection, and improving the reliability of the system using PCIE switching.

Further, each PCIE interface controller is also configured to send fixed-time detection TLPs to all other PEICs at a time interval, and for a destination PEIC from which no returned detection reply TLP is received in specified time, update a corresponding sending link. Preferably, each PCIE interface controller sends fixed-time detection TLPs to all other PEICs in a communication connection at a time interval (the time interval may be configured according to network conditions, for example, the time interval is set to a value between 10 us and 1 ms), and for a destination PEIC from which no returned detection reply TLP is received in specified time, switch active and standby links. The specified time may also be configured according to the network conditions, and is greater than a period from time when the fixed-time detection TLP is sent to time when the detection reply TLP should be received. If no detection reply TLP is received when the specified time expires, it indicates that a communication route to the destination PEIC has a problem, such as a link failure or a failure of the PCIE switching unit. In this case, the PEIC updates the corresponding sending link, that is, whether the TLP is sent through the active link or the standby link. In the embodiment of the present invention, a detection packet is sent, thereby implementing failure detection on a link between PEICs, ensuring automatic switching of active and standby planes, and further ensuring reliable packet transmission in a PCIE dual-plane switching network system.

Figure 21:
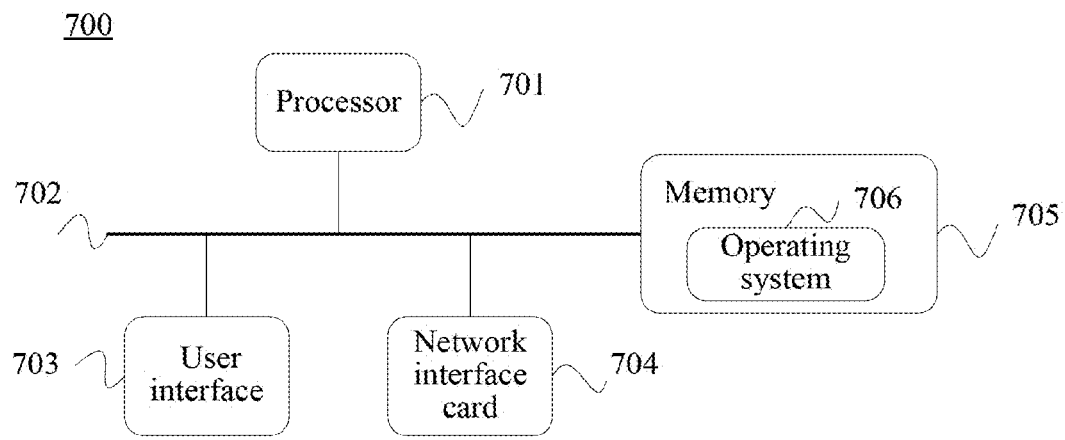
FIG. 21 is a structural diagram of a PCIE interface controller according to Embodiment 13 of the present invention.

FIG. 21 is a structural diagram of a PCIE interface controller according to Embodiment 13 of the present invention. As shown in the figure, a PCIE interface controller 700 in this embodiment includes at least a processor 701, a memory 705, at least one network interface card 704, and at least one communication bus 702. Optionally, the PCIE interface controller 700 includes a user interface 703, which includes a display, a keyboard or a clicking device. The memory 705 stores an execution instruction. When the PCIE interface controller 700 runs, the processor 701 communicates with the memory 705, and the processor 701 executes the execution instruction, so that the PCIE interface controller 700 executes the method described in Embodiment 7 of the present invention. Implementation principles and technical effects are similar, and are not repeatedly described here. An operating system 706 includes various programs, configured to implement various basic services and process tasks based on hardware. The PCIE interface controller 700 further includes a display interface card. Further, the processor 701 executes the execution instruction, which also enables the PCIE interface controller 700 to execute the method described in Embodiment 8 of the present invention. The implementation principles and technical effects are similar, and are not repeatedly described here. In addition, the embodiment of the present invention further provides a computer readable medium, including a computer execution instruction, where the computer execution instruction can enable the PCIE interface controller 700 to execute the method described in Embodiment 7 of the present invention. The computer execution instruction can also enable the PCIE interface controller 700 to execute the method described in Embodiment 8 of the present invention. The implementation principles and technical effects are similar, and are not repeatedly described here.

Figure 22:
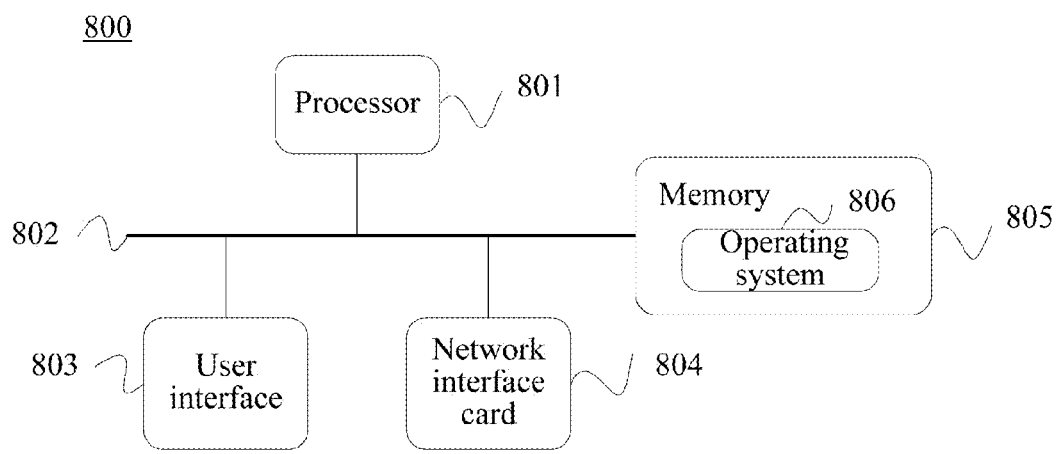
FIG. 22 is a structural diagram of a PCIE interface controller according to Embodiment 14 of the present invention.

FIG. 22 is a structural diagram of a PCIE interface controller according to Embodiment 14 of the present invention. As shown in the figure, a PCIE interface controller 800 of this embodiment includes at least one processor 801, a memory 805, at least one network card interface 804, and at least one communication bus 802. Optionally, the PCIE interface controller 800 includes a user interface 803, which includes a display, a keyboard, or a clicking device. The memory 805 stores an execution instruction. When the PCIE interface controller 800 runs, the processor 801 communicates with the memory 805, and the processor 801 executes the execution instruction, so that the PCIE interface controller 800 executes the method described in Embodiment 9 of the present invention. Implementation principles and technical effects are similar, and are not repeatedly described here. An operating system 806 includes various programs, configured to implement basic services and process tasks based on hardware. The PCIE interface controller 800 may further include a display interface card. Further, the processor 801 executes the execution instruction, which also enables the PCIE interface controller 800 to execute the method described in Embodiment 10 of the present invention. The implementation principles and technical effects are similar, and are not described here. In addition, the embodiment of the present invention further provides a computer readable medium, including a computer execution instruction, where the computer execution instruction can enable the PCIE interface controller 800 to perform the method described in Embodiment 9 of the present invention. Further, the computer execution instruction can enable the PCIE interface controller 800 to execute the method described in Embodiment 10 of the present invention. The implementation principles and technical effects are similar, and are not repeatedly described here.

Through the foregoing description of the implementation manners, persons skilled in the art may clearly understand that the present invention may be implemented through hardware, firmware, or a combination of hardware and firmware. When software is used for implementation, the foregoing functions may be stored in a computer readable medium or transmitted as one or more instructions or codes on a computer readable medium. The computer readable medium includes a storage medium and a communication medium of the computer. The communication medium includes any medium capable of transferring a computer program from one place to another place; and the storage medium may be any available medium that can be accessed by the computer. The computer readable medium may include, but is not limited to: a RAM, a ROM, an EEPROM, a CD-ROM or another optical disk storage or magnetic disk storage medium, or another magnetic storage device, or any other medium that is capable of carrying or storing expected program codes having an instruction or a data structure form and can be accessed by the computer. Besides, any connection may properly become a computer readable medium. For example, if software is transmitted from a website, a server or another remote source by using a coaxial cable, an optical fiber cable, a twisted pair cable, a digital subscriber line (DSL), or wireless technologies such as infrared rays, radio and microwaves, the coaxial cable, optical fiber cable, twisted pair cable, DSL, or wireless technologies such as infrared rays, radio and microwaves are included in the definition of the medium. For example, the disk (Disk) and disc (disc) used in the present invention includes a compact disc (CD), a laser disc, an optical disc, a digital video disc (DVD), a floppy disk and a blue ray disc. The disk usually duplicates data magnetically, and the disc usually duplicates data optically by using a laser. The foregoing combination shall also fall within the protection scope of the computer readable medium.

It should be noted that, the "first PEIC" described in the embodiments of the present invention is actually a PEIC, and each of the described "second PEIC" "third PEIC" and "fourth PEIC" is also a PEIC. The naming is for the purpose of distinguishing the first PEIC from the subsequent second PEIC, third PEIC, and fourth PEIC. The terms "first" "second" "third" and "fourth" do not indicate any sequential or logic relationship, but are used to indicate that PEICs are independent from each other. Definitely, in order to distinguish two PEICs, other naming manners may also be used as long as the two PEICs are indicated as two separate PEICs. For example, the PEICs may be named as PEICa and PEICb, and so on. The illustration about the terms "first", "second", "third", and "fourth" is also applicable to the following terms that appear in the embodiments of the present invention: "first TLP", "second TLP", "third TLP", and "fourth TLP"; "first acknowledgment packet" and "second acknowledgment packet"; and "first PCIE node device" and "second PCIE node device".

In conclusion, the foregoing description is merely exemplary embodiments the technical solutions of the present invention, but are not intended to limit the protection scope of the present invention. Any modification, equivalent replacement, or improvement made within the spirit and principle of the present invention shall fall within the protection scope of the present invention.

What is claimed is:

1. A peripheral component interconnect express interface controller (PEIC) comprising:
   a PCI to PCI bridge (P2P) module configured to receive a third transaction layer packet (TLP) from a root complex (RC) or an endpoint device (EP), and forward the third TLP to a reliable TLP transmission RTT module;
   wherein the reliable TLP transmission (RTT) module configured to
      search a corresponding address forwarding table or ID forwarding table according to a type of the third TLP and obtain a destination PEIC number, so as to determine a sending link connected to a peripheral component interconnect express (PCIE) switching unit of two PCIE switching units, wherein the PEIC connects to the two PCIE switching units through two sending links respectively;
      send the third TLP to the PCIE switching unit through the sending link; and
      send the third TLP again through a sending link of the two sending links if no first acknowledgment message TLP returned by a destination PEIC of the third TLP and forwarded by the PCIE switching unit is received when time is out.

2. The interface controller according to claim 1, wherein the RTT module is further configured to encapsulate the third TLP, add a source PEIC number and a TLP sending sequence number in a self-defined end-to-end TLP prefix of the third TLP, and send the encapsulated third TLP to the PCIE switching unit through the sending link, wherein a self-defined end-to-end TLP prefix of a returned first acknowledgment message TLP carries a PEIC number of the destination PEIC of the third TLP and an acknowledged TLP sending sequence number;

wherein the TLP sending sequence number in the third TLP is a sequence number of a TLP sent by a source PEIC of the third TLP to a destination PEIC of the third TLP, and the acknowledged TLP sending sequence number in the first acknowledgment message TLP is a TLP sending sequence number which is of the source PEIC and is of the third TLP already received by the destination PEIC of the third TLP.

3. The interface controller according to claim 1, wherein the reliable TLP transmission module comprises:

a TLP dispatch module configured to search a corresponding address forwarding table or ID forwarding table according to the received third TLP, determine a TLP transmission queue TTQ, and put the third TLP into the TLP transmission queue, wherein the TLP transmission queue corresponds to a destination PEIC of the third TLP;

a send module configured to send the third TLP in the TLP transmission queue to the PCIE switching unit through a sending link of the TLP transmission queue; and further configured to send the third TLP again through one sending link of the two sending links if no first acknowledgment message TLP returned by the destination PEIC of the third TLP and forwarded by the PCIE switching unit is received when time is out;

a receive module configured to receive the first acknowledgment message TLP returned by the destination PEIC of the third TLP and forwarded by the PCIE switching unit, and transfer the first acknowledgment message TLP to an acknowledgment module;

wherein the acknowledgment module is configured to notify, according to TLP sending sequence number information and a source PEIC number that are carried in the first acknowledgment message TLP, a TLP transmission queue management module of deleting an acknowledged third TLP in the TLP transmission queue; and wherein the TLP transmission queue management module is configured to delete the acknowledged third TLP in the TLP transmission queue according to the notification of the acknowledgment module.

4. The interface controller according to claim 3, wherein the send module is further configured to encapsulate the third TLP, add a source PEIC number (SPEIC) and a TLP sending sequence number in an end-to-end TLP prefix of the third TLP, and send the encapsulated third TLP to the PCIE switching unit through the sending link of the TTQ, wherein an end-to-end TLP prefix of a returned first acknowledgment message TLP carries the source PEIC number and an acknowledged TLP sending sequence number;

wherein the TLP sending sequence number of the third TLP is a sequence number of a TLP sent by the source PEIC of the third TLP to a destination PEIC of the third TLP, and the acknowledged TLP sending sequence number of the first acknowledgment message is a TLP sending sequence number which is of the source PEIC and is of the third TLP already received by the destination PEIC of the third TLP.

5. The interface controller according to claim 4, wherein the acknowledgment module is further configured to update a sliding window of a corresponding TTQ according to acknowledged sending sequence number information and the source PEIC number that are carried in the received first acknowledgment message TLP.

6. The interface controller according to claim 3, wherein the TLP transmission queue management module is further configured to maintain a TLP sending sequence number and a TLP sending link of each TLP transmission queue.

7. The interface controller according to claim 3, wherein the receive module is further configured to receive a fourth TLP sent from the PCIE switching unit, determine whether the fourth TLP is an acknowledgment message TLP, if the fourth TLP is not the acknowledgment message TLP, buffer the received fourth TLP into a TLP acknowledge sequence TAS corresponding to a source PEIC of the fourth TLP; and wherein the P2P module is further configured to obtain the fourth TLP in the TLP acknowledge sequence TAS, and forward the fourth TLP to a destination RC/EP of the fourth TLP.

8. The interface controller according to claim 7, wherein the reliable TLP transmission module further comprises:

a TLP acknowledge sequence management module configured to, after the TLP acknowledge sequence receives the fourth TLP, notify the acknowledgment module of returning an acknowledgment message TLP to the source PEIC of the fourth TLP;

wherein the acknowledgment module is further configured to generate a second acknowledgment message TLP, and buffer the second acknowledgment message TLP into a TLP transmission queue corresponding to the source PEIC of the fourth TLP, so that the second acknowledgment message TLP is scheduled and sent by the send module.

9. The interface controller according to claim 3, wherein the reliable TLP transmission module further comprises:

a heartbeat module configured to send fixed-time detection TLPs to all other PEICs at a time interval, and if no detection reply TLP returned by a destination PEIC is received in specified time, notify the TLP sending queue management module of updating a sending link of a TTQ corresponding to a destination PEIC that returns the detection reply TLP;

wherein the TLP transmission queue management module is further configured to update the sending link of the TLP transmission queue according to the notification of the heartbeat module.

10. A method for packet transmission in a peripheral component interconnect express switching network, the method comprising:

receiving a third transaction layer packet (TLP) from a root complex (RC) or an endpoint device (EP);

searching a corresponding address forwarding table or ID forwarding table according to a type of the third TLP and obtaining a destination PEIC number, so as to determine a sending link connected to a peripheral component interconnect express (PCIE) switching unit of two PCIE switching units, wherein the sending link is one sending link of two sending links connect to two PCIE switching unit respectively;

sending the third TLP to the PCIE switching unit through the sending link; and sending the third TLP again through a sending link of the two sending links if no first acknowledgment message TLP returned by a destination PEIC of the third TLP and forwarded by the PCIE switching unit is received when time is out, wherein the first acknowledgment message TLP is a packet for acknowledging that the third TLP is received.

11. The method according to claim 10, wherein before the sending the third TLP to the PCIE switching unit through the sending link, the method further comprises:
- encapsulating the third TLP, and adding a source PEIC number and a TLP sending sequence number in a self-defined end-to-end TLP prefix of the third TLP, wherein an end-to-end TLP prefix of a returned first acknowledgment message TLP carries a PEIC number of the destination PEIC of the third TLP and an acknowledged TLP sending sequence number;
- wherein the TLP sending sequence number in the third TLP is a sequence number of a TLP sent by a source PEIC of the third TLP to a destination PEIC of the third TLP, and the acknowledged TLP sending sequence number in the first acknowledgment message TLP is a TLP sending sequence number which is of the source PEIC and is of the third TLP already received by the destination PEIC of the third TLP.

12. The method according to claim 11, further comprising sending fixed-time detection TLPs to all other PEICs at a time interval, and if no detection reply TLP returned by a destination PEIC is received in specified time, updating a sending link of a corresponding TLP transmission queue.

13. The method according to claim 10, wherein the determining, according to the received third TLP, the sending link connected to the PCIE switching unit of two PCIE switching units and sending the third TLP to the PCIE switching unit through the sending link comprises:
- searching a corresponding address forwarding table or ID forwarding table according to the received third TLP, determining a TLP transmission queue TTQ, and putting the third TLP into the TLP transmission queue, wherein the TLP transmission queue corresponds to a destination PEIC of the third TLP; and
- sending the third TLP to the PCIE switching unit through a sending link of the TLP transmission queue.

14. The method according to claim 13, further comprising:
- receiving a first acknowledgment message TLP returned by a destination PEIC of the third TLP and forwarded by the PCIE switching unit; and
- deleting the acknowledged third TLP in the TLP transmission queue according to a TLP sending sequence number and a source PEIC number that are carried in the first acknowledgment message TLP.

15. The method according to claim 14, further comprising maintaining a TLP sending sequence number and a TLP sending link of each TLP transmission queue.

16. The method according to claim 14, further comprising updating a sliding window of a corresponding TLP transmission queue according to acknowledged TLP sending sequence number information and the source PEIC number that are carried in the first acknowledgment message TLP.

17. The method according to claim 13, wherein before the receiving the first acknowledgment message TLP returned by a destination PEIC of the third TLP and forwarded by the PCIE switching unit, the method further comprises:
- receiving a fourth TLP sent by the PCIE switching unit, determining, according to a type of the fourth TLP, whether the fourth TLP is the first acknowledgment message TLP, and if the fourth TLP is not the first acknowledgment message TLP, forwarding the received fourth TLP to a destination RC or a destination EP of the fourth TLP.

18. The method according to claim 17, further comprising returning a second acknowledgment message TLP to a source PEIC of the fourth TLP.

19. A system for packet transmission in a peripheral component interconnect express switching network comprising:
- at least two peripheral component interconnect express (PCIE) node devices, at least two PCIE interface controllers (PEIC), and two PCIE switching units, wherein each of the at least two PCIE node devices is connected to one of the at least two PCIE interface controllers, and each of the at least two PCIE interface controllers is connected to the two PCIE switching units respectively;
- a third PCIE node device in the at least two PCIE node devices is configured to send a third TLP to a connected third PCIE interface controller in the at least two PCIE interface controllers;
- wherein the third PCIE interface controller is configured to
  - receive the third TLP, determine, according to the received third TLP, a sending link connected to one of the two PCIE switching units,
  - send the third TLP to the PCIE switching unit through the sending link, and
  - send the third TLP to a fourth PCIE interface controller again through the sending link connected to the PCIE switching unit if no first acknowledgment message TLP returned by the fourth PCIE interface controller of the at least two PCIE interface controllers and forwarded by the PCIE switching unit is received when time is out, wherein the fourth PCIE interface controller is a destination PCIE interface controller of the third TLP;
- wherein the PCIE switching unit is configured to
  - forward the third TLP to the fourth PCIE interface controller, and
  - forward the first acknowledgment message TLP returned by the fourth PCIE interface controller to the third PCIE interface controller;
- wherein the fourth PCIE interface controller is configured to
  - receive the third TLP forwarded by the PCIE switching unit and
  - send the third TLP to a fourth PCIE node device of the at least two PCIE node devices, wherein the second PCIE node device is a destination PCIE node device of the third TLP; and
  - return the first acknowledgment message TLP to the third PCIE interface controller, so as to acknowledge that the third TLP is received; and
- wherein the fourth PCIE node device is configured to receive the third TLP forwarded by the fourth PCIE interface controller.

20. The system according to claim 19, wherein the third PEIC is further configured to receive the first acknowledgment message TLP returned by the fourth PEIC and forwarded by the PCIE switching unit, and delete the acknowledged third TLP according to TLP sending sequence number information and a source PEIC number that are carried in the first acknowledgment message TLP.

21. The system according to claim 19, wherein:
- the third PEIC is further configured to encapsulate the TLP, add a source PEIC number SPEIC and a TLP sending sequence number in an end-to-end TLP prefix of the third TLP, and send the encapsulated third TLP to the PCIE switching unit through the sending link; and
- the fourth PEIC is further configured to return the first acknowledgment message TLP according to the source PEIC number and the TLP sending sequence number that are carried in the third TLP, wherein an end-to-end TLP prefix of the returned first acknowledgment message TLP carries the source PEIC number and an acknowledged TLP sending sequence number, the TLP sending sequence number is a sequence number of a TLP sent by the third PEIC to the fourth PEIC, and the acknowledged TLP sending sequence number is a sending sequence number of a TLP already received by the fourth PEIC from the third PEIC.

22. The system according to claim 21, wherein the third PEIC is further configured to maintain a TLP sending sequence number and a TLP sending link to another PEIC.

23. The system according to claim 19, wherein each PCIE interface controller is further configured to
- send fixed-time detection TLPs to all other PEICs at a time interval, and
- update a sending link corresponding to a PEIC from which no returned detection reply TLP is received in specified time.

24. The system according to claim 19, wherein the PCIE node device is a root complex RC or an endpoint device EP, and each PCIE interface controller is connected to one RC or at least one EP.

25. A peripheral component interconnect express interface controller (PEIC) comprising a processor and a memory, wherein the memory stores an execution instruction; when the PEIC runs, the processor communicates with the memory, and the processor executes the execution instruction, so that the peripheral component interconnect express interface controller PEIC executes the method according to claim 10.

26. A computer readable medium, comprising a computer execution instruction, wherein the computer execution instruction is used for enabling a peripheral component interconnect express interface controller PEIC to execute the method according to claim 10.

* * * * *